(12) United States Patent
Schneider et al.

(10) Patent No.: US 12,059,777 B2
(45) Date of Patent: Aug. 13, 2024

(54) POWERED SCREWDRIVER INCLUDING CLUTCH SETTING SENSOR

(71) Applicant: MILWAUKEE ELECTRIC TOOL CORPORATION, Brookfield, WI (US)

(72) Inventors: Jacob P. Schneider, Cedarburg, WI (US); Maxwell L Merget, Milwaukee, WI (US); Douglas R. Fieldbinder, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 15 days.

(21) Appl. No.: 17/398,748

(22) Filed: Aug. 10, 2021

(65) Prior Publication Data

US 2022/0040831 A1 Feb. 10, 2022

Related U.S. Application Data

(60) Provisional application No. 63/063,737, filed on Aug. 10, 2020.

(51) Int. Cl.
*B25B 23/147* (2006.01)
*B25B 23/14* (2006.01)
(Continued)

(52) U.S. Cl.
CPC .......... *B25B 23/147* (2013.01); *B25B 23/141* (2013.01); *F16D 15/00* (2013.01); *F16D 27/108* (2013.01); *F16D 48/06* (2013.01)

(58) Field of Classification Search
CPC ........ F16D 15/00; F16D 27/108; F16D 48/06; F16D 2300/18; F16D 2500/3026;
(Continued)

(56) References Cited

U.S. PATENT DOCUMENTS 2,889,902 A 6/1959 Harrison et al.
3,174,559 A 3/1965 Vaughn
(Continued)

FOREIGN PATENT DOCUMENTS

DE 8327261 U1 4/1984
JP H04268428 A 9/1992
(Continued)

OTHER PUBLICATIONS

Milwaukee Tool, "M12 Fuel 1/4" Hex 2-Speed Screwdriver," <https://www.milwaukeetool.com/Products/Power-Tools/Fastening/2402-20> web page visited Aug. 12, 2021.
(Continued)

*Primary Examiner* — Thomas M Wittenschlaeger
*Assistant Examiner* — Katie L Gerth
(74) *Attorney, Agent, or Firm* — Michael Best & Friedrich LLP

(57) ABSTRACT

A rotary power tool including a gear case, an output shaft extending from the gear case, and a drive mechanism configured to provide torque to the output shaft, causing the output shaft to rotate. The rotary power tool further includes a clutch mechanism between the output shaft and the drive mechanism. The clutch mechanism includes a compression spring and is configured to limit the amount of torque provided by the output shaft. The rotary power tool further includes a sensor positioned on a neck portion of the gear case subject to strain imparted by the compression spring, and an electronic control unit configured to receive an output signal from the strain gauge and determine a torque setting of the clutch mechanism based on the output signal.

14 Claims, 14 Drawing Sheets

(51) Int. Cl.
*F16D 15/00* (2006.01)
*F16D 27/108* (2006.01)
*F16D 48/06* (2006.01)

(58) Field of Classification Search
CPC ..... F16D 2500/3027; F16D 2500/7041; B25B 23/147; B25B 23/141
See application file for complete search history.

(56) References Cited

U.S. PATENT DOCUMENTS

| | | |
|---|---|---|
| 3,263,426 A | 8/1966 | Skoog |
| 3,387,669 A | 6/1968 | Wise, Jr. et al. |
| 3,419,087 A | 12/1968 | Amtsberg et al. |
| 3,477,007 A | 11/1969 | Ducommun et al. |
| 3,572,447 A | 3/1971 | Pauley et al. |
| 3,596,718 A | 8/1971 | Fish et al. |
| 3,616,864 A | 11/1971 | Sorensen et al. |
| 3,710,874 A | 1/1973 | Seccombe et al. |
| 3,832,897 A | 9/1974 | Schenck |
| 3,920,082 A | 11/1975 | Dudek |
| 3,962,910 A | 6/1976 | Spyridakis et al. |
| 4,016,938 A | 4/1977 | Rice |
| 4,066,942 A | 1/1978 | Bardwell et al. |
| 4,089,216 A | 5/1978 | Elias |
| 4,104,778 A | 8/1978 | Miet |
| 4,106,176 A | 8/1978 | Rice et al. |
| 4,163,310 A | 8/1979 | Sigmund |
| 4,244,245 A | 1/1981 | Wallace et al. |
| 4,344,216 A | 8/1982 | Finkelston |
| 4,375,120 A | 3/1983 | Sigmund |
| 4,375,121 A | 3/1983 | Sigmund |
| 4,375,122 A | 3/1983 | Sigmund |
| 4,375,123 A | 3/1983 | Ney |
| 4,413,396 A | 11/1983 | Wallace et al. |
| 4,418,590 A | 12/1983 | Dubiel et al. |
| 4,485,682 A | 12/1984 | Stroezel et al. |
| 4,487,270 A | 12/1984 | Huber |
| 4,510,424 A | 4/1985 | Doniwa |
| 4,562,389 A | 12/1985 | Jundt et al. |
| 4,571,696 A | 2/1986 | Bitzer |
| 4,610,339 A * | 9/1986 | Ciolli .................... B25B 23/141 192/81 C |
| 4,620,449 A | 11/1986 | Borries et al. |
| 4,620,450 A | 11/1986 | Yamaguchi |
| 4,759,225 A | 7/1988 | Reynertson et al. |
| 4,772,186 A | 9/1988 | Pyles et al. |
| 4,782,725 A | 11/1988 | Spaulding |
| 4,822,215 A | 4/1989 | Alexander |
| 4,873,453 A | 10/1989 | Schmerda et al. |
| 4,987,806 A | 1/1991 | Lehnert |
| 5,014,793 A | 5/1991 | Germanton et al. |
| 5,014,794 A | 5/1991 | Germanton et al. |
| 5,083,068 A | 1/1992 | Neef |
| 5,154,242 A | 10/1992 | Soshin et al. |
| 5,172,774 A | 12/1992 | Melrose |
| 5,215,270 A | 6/1993 | Udocon et al. |
| 5,285,857 A | 2/1994 | Shimada |
| 5,311,108 A | 5/1994 | Willard |
| 5,315,501 A | 5/1994 | Whitehouse |
| 5,404,775 A | 4/1995 | Abe |
| 5,442,965 A | 8/1995 | Halén |
| 5,526,460 A | 6/1996 | DeFrancesco et al. |
| 5,533,410 A | 7/1996 | Smith |
| 5,637,968 A | 6/1997 | Kainec et al. |
| 5,650,573 A | 7/1997 | Bruns et al. |
| 5,689,159 A | 11/1997 | Culp et al. |
| 5,739,605 A | 4/1998 | Lazorchak |
| 5,784,935 A | 7/1998 | Korinek |
| 5,889,922 A | 3/1999 | Bufe et al. |
| 5,894,094 A | 4/1999 | Kuchler et al. |
| 5,897,454 A | 4/1999 | Cannaliato |
| 5,898,598 A | 4/1999 | Szwast et al. |
| 5,918,201 A | 6/1999 | Szwast et al. |
| 5,963,707 A | 10/1999 | Carr |
| 6,134,973 A | 10/2000 | Schoeps |
| 6,161,629 A | 12/2000 | Hohmann et al. |
| 6,341,533 B1 | 1/2002 | Schoeps |
| 6,347,554 B1 | 3/2002 | Klingler |
| 6,378,623 B2 | 4/2002 | Kawarai |
| 6,516,896 B1 | 2/2003 | Bookshar et al. |
| 6,536,536 B1 | 3/2003 | Gass et al. |
| 6,616,446 B1 | 9/2003 | Schmid |
| 6,868,742 B2 | 3/2005 | Schoeps |
| 6,962,088 B2 | 11/2005 | Horiuchi |
| 6,964,205 B2 | 11/2005 | Papakostas et al. |
| 7,062,979 B2 | 6/2006 | Day et al. |
| 7,082,865 B2 | 8/2006 | Reynertson, Jr. |
| 7,090,030 B2 | 8/2006 | Miller |
| 7,210,541 B2 | 5/2007 | Miller |
| 7,234,378 B2 | 6/2007 | Reynertson, Jr. |
| 7,249,526 B2 | 7/2007 | Hsieh |
| 7,258,026 B2 | 8/2007 | Papakostas et al. |
| 7,275,450 B2 | 10/2007 | Hirai et al. |
| 7,410,006 B2 | 8/2008 | Zhang et al. |
| 7,552,781 B2 | 6/2009 | Zhang et al. |
| 7,770,658 B2 | 8/2010 | Ito et al. |
| 7,779,704 B1 | 8/2010 | Chu |
| 7,886,635 B2 | 2/2011 | Kaneyama et al. |
| 7,900,715 B2 | 3/2011 | Chen |
| 7,942,211 B2 | 5/2011 | Scrimshaw et al. |
| 8,025,106 B2 | 9/2011 | Schmidt |
| 8,171,827 B2 | 5/2012 | Gareis |
| 8,264,374 B2 | 9/2012 | Obatake et al. |
| 8,302,702 B2 | 11/2012 | Hansson et al. |
| 8,316,958 B2 | 11/2012 | Schell et al. |
| 8,353,363 B2 | 1/2013 | Hirt et al. |
| RE44,311 E | 6/2013 | Zhang et al. |
| 8,505,415 B2 | 8/2013 | Hanspers et al. |
| 8,522,650 B2 | 9/2013 | Tatsuno |
| RE44,993 E | 7/2014 | Vanko et al. |
| RE45,112 E | 9/2014 | Zhang et al. |
| 8,905,895 B2 | 12/2014 | Scalf et al. |
| 9,212,725 B2 | 12/2015 | Steckel et al. |
| 9,281,770 B2 | 3/2016 | Wood et al. |
| 9,352,456 B2 | 5/2016 | Murthy et al. |
| 10,252,388 B2 | 4/2019 | Takahashi |
| 10,357,871 B2 | 7/2019 | Thorson et al. |
| 2002/0037785 A1 | 3/2002 | Wissmach et al. |
| 2002/0066632 A1 | 6/2002 | Kristen et al. |
| 2003/0009262 A1 | 1/2003 | Colangelo, III et al. |
| 2003/0173096 A1 | 9/2003 | Setton et al. |
| 2004/0182587 A1 | 9/2004 | May et al. |
| 2005/0274230 A1 | 12/2005 | Lin |
| 2007/0144753 A1 | 6/2007 | Miller |
| 2008/0127711 A1 | 6/2008 | Farag |
| 2009/0101376 A1 * | 4/2009 | Walker .................... B25B 21/00 173/47 |
| 2009/0102407 A1 | 4/2009 | Klemm et al. |
| 2009/0139738 A1 | 6/2009 | Lippek |
| 2010/0116519 A1 | 5/2010 | Gareis |
| 2010/0139432 A1 | 6/2010 | Steckel et al. |
| 2011/0036189 A1 | 2/2011 | Hausseecker et al. |
| 2011/0127059 A1 | 6/2011 | Limberg et al. |
| 2011/0185864 A1 | 8/2011 | Ide |
| 2011/0259703 A1 | 10/2011 | Kuwabara |
| 2012/0085562 A1 | 4/2012 | Elsmark |
| 2012/0285712 A1 * | 11/2012 | Walker .................. B25B 23/141 173/48 |
| 2012/0318550 A1 | 12/2012 | Tanimoto et al. |
| 2013/0037288 A1 | 2/2013 | Schell et al. |
| 2013/0105189 A1 * | 5/2013 | Murthy .................... B25B 23/14 477/177 |
| 2013/0133912 A1 | 5/2013 | Mizuno et al. |
| 2013/0193881 A1 * | 8/2013 | Muto ..................... B25B 21/00 318/139 |
| 2013/0193891 A1 | 8/2013 | Wood et al. |
| 2013/0333910 A1 | 12/2013 | Tanimoto et al. |
| 2014/0011621 A1 | 1/2014 | Steckel et al. |
| 2014/0026723 A1 | 1/2014 | Persson et al. |
| 2014/0090224 A1 | 4/2014 | Khalaf et al. |
| 2014/0102741 A1 | 7/2014 | Sekino et al. |
| 2015/0165604 A1 | 6/2015 | Bartoszek |
| 2016/0318165 A1 * | 11/2016 | Thorson ................ B25B 23/141 |

(56) References Cited

U.S. PATENT DOCUMENTS

| | | | | |
|---|---|---|---|---|
| 2016/0354888 A1* | 12/2016 | Huber | ............... | B25F 5/001 |
| 2017/0361432 A1* | 12/2017 | Johansson | ............... | B25B 21/00 |
| 2018/0001446 A1 | 1/2018 | Elsmark | | |
| 2019/0134801 A1* | 5/2019 | Merget | ............... | B25F 5/001 |
| 2019/0283222 A1* | 9/2019 | Thorson | ............... | B25B 23/141 |
| 2020/0238483 A1* | 7/2020 | Kamiya | ............... | B25B 21/023 |
| 2020/0398409 A1* | 12/2020 | Jenkins | ............... | B25B 23/1425 |

FOREIGN PATENT DOCUMENTS

| | | | | | |
|---|---|---|---|---|---|
| JP | 2019066365 A | | 4/2019 | | |
| KR | 101476257 B1 | | 12/2014 | | |
| KR | 20220010623 A | * | 1/2022 | ........... | B25B 23/147 |
| WO | 2000071302 A1 | | 11/2000 | | |
| WO | 2008028765 A | | 3/2008 | | |
| WO | 2010065856 A1 | | 6/2010 | | |
| WO | 2012134474 A1 | | 10/2012 | | |

OTHER PUBLICATIONS

International Search Report and Written Opinion for Application No. PCT/US2021/045390 dated Nov. 24, 2021 (10 pages).

Japanese Patent Office Action for Application No. 2023-507371 dated Apr. 16, 2024 (15 pages including machine English translation).

* cited by examiner

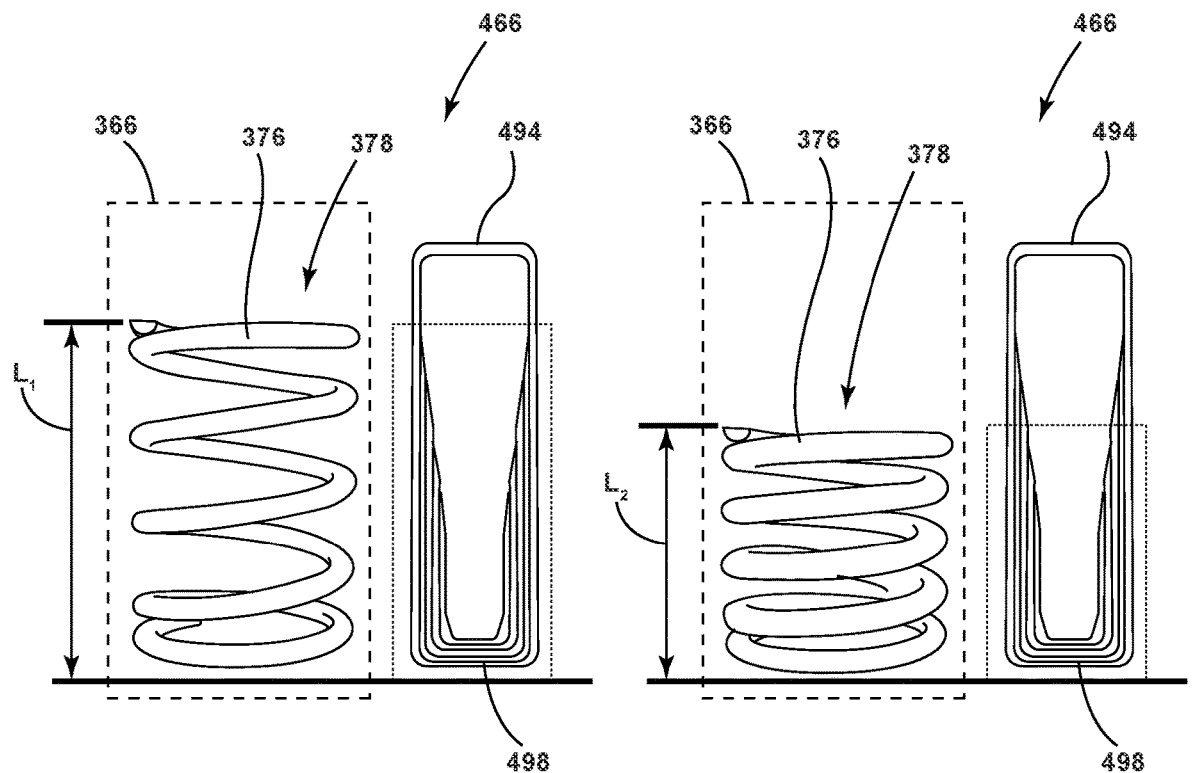
FIG. 11  FIG. 12
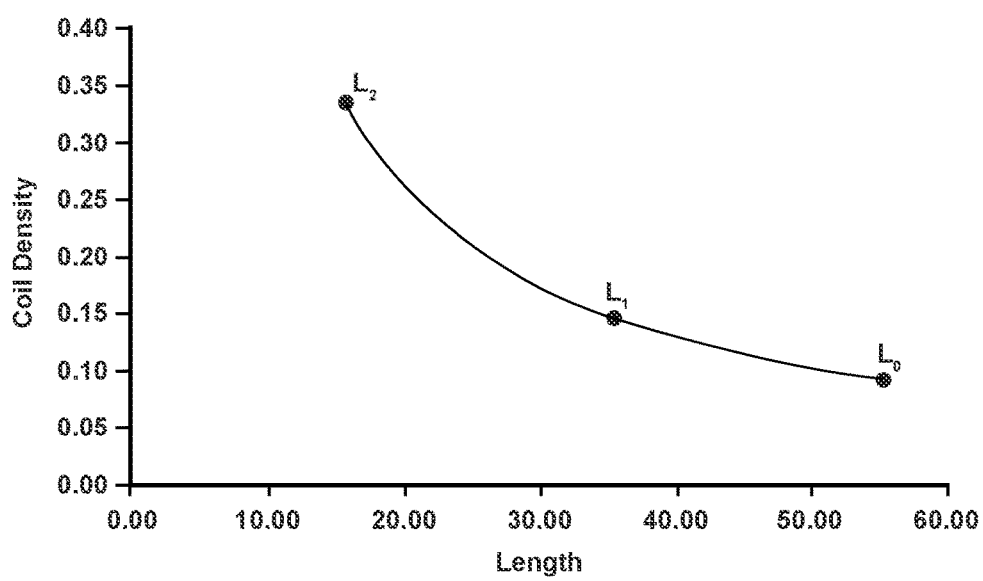
FIG. 13

POWERED SCREWDRIVER INCLUDING CLUTCH SETTING SENSOR

CROSS-REFERENCE TO RELATED APPLICATIONS

This application claims priority to U.S. Provisional Patent Application No. 63/063,737, filed on Aug. 10, 2020, the entire content of which is incorporated by reference herein.

FIELD OF THE DISCLOSURE

The present invention relates generally to power tools, and in particular to powered screwdrivers.

BACKGROUND OF THE DISCLOSURE

Powered screwdrivers are used to tighten and apply torque to fasteners and the like. Some powered screwdrivers include a clutch mechanism that allows the user to limit the torque applied to fasteners.

SUMMARY OF THE INVENTION

The present invention provides, in one aspect, a rotary power tool including a gear case, an output shaft extending from the gear case, and a drive mechanism configured to provide torque to the output shaft, causing the output shaft to rotate. The rotary power tool further includes a clutch mechanism between the output shaft and the drive mechanism. The clutch mechanism includes a compression spring and is configured to limit the amount of torque provided by the output shaft. The rotary power tool further includes a sensor positioned on a neck portion of the gear case subject to strain imparted by the compression spring, and an electronic control unit configured to receive an output signal from the strain gauge and determine a torque setting of the clutch mechanism based on the output signal.

The present inventions provides, in another aspect, a rotary power tool including a gear case, an output shaft extending from the gear case, and a drive mechanism configured to provide torque to the output shaft, causing the output shaft to rotate. The rotary power tool further includes a clutch mechanism between the output shaft and the drive mechanism. The clutch mechanism includes a compression spring and is configured to limit the amount of torque provided by the output shaft. The rotary power tool further includes an inductive sensor proximate the compression spring such that a voltage is induced in the inductive sensor in response to relative movement between the compression spring and a magnetic field emitted by the inductive sensor. The rotary power tool further includes an electronic control unit configured to receive an output signal from the inductive sensor indicative of the change in inductance in the inductive sensor and determine a torque setting of the clutch mechanism based on the output signal.

The present invention provides, in another aspect, a rotary power tool including a gear case, an output shaft extending from the gear case, and a drive mechanism configured to provide torque to the output shaft, causing the output shaft to rotate. The rotary power tool further includes a clutch mechanism between the output shaft and the drive mechanism. The clutch mechanism includes a compression spring and is configured to limit the amount of torque provided by the output shaft. The rotary power tool further includes a clutch adjustment assembly configured to adjust a compressed length of the compression spring. The rotary power tool further includes a lockout mechanism adjustable between a lockout state, in which adjustment of the compressed length of the compression spring by the clutch adjustment assembly is prevented, and a release state, in which adjustment of the compressed length of the compression spring by the clutch adjustment assembly is permitted.

Other features and aspects of the invention will become apparent by consideration of the following detailed description and accompanying drawings.

BRIEF DESCRIPTION OF THE DRAWINGS

FIG. 11 is a plan view of the main clutch sensor of FIG. 10, illustrating the clutch spring of the clutch mechanism in a variable torque setting between the low torque setting and the high torque setting.

FIG. 12 is a plan view of the main clutch sensor of FIG. 10, illustrating the clutch spring of the clutch mechanism in the high torque setting.

FIG. 13 is a graphical illustration of the ratio between the coil density and length of the clutch spring as the clutch mechanism transitions between the low torque setting and the high torque setting.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
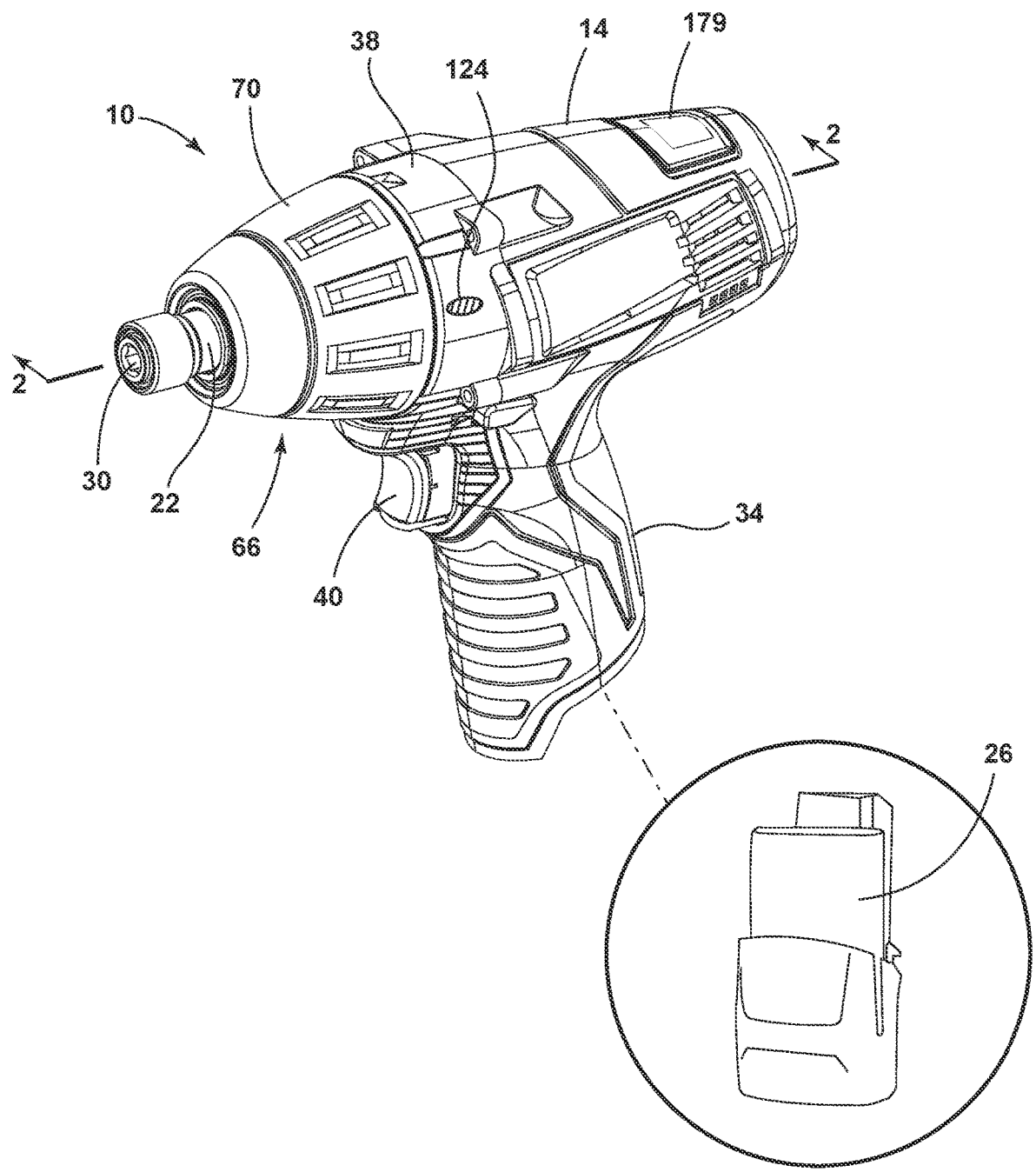
FIG. 1 is a front perspective view of a powered screwdriver in accordance with an embodiment of the present invention.
Figure 2:
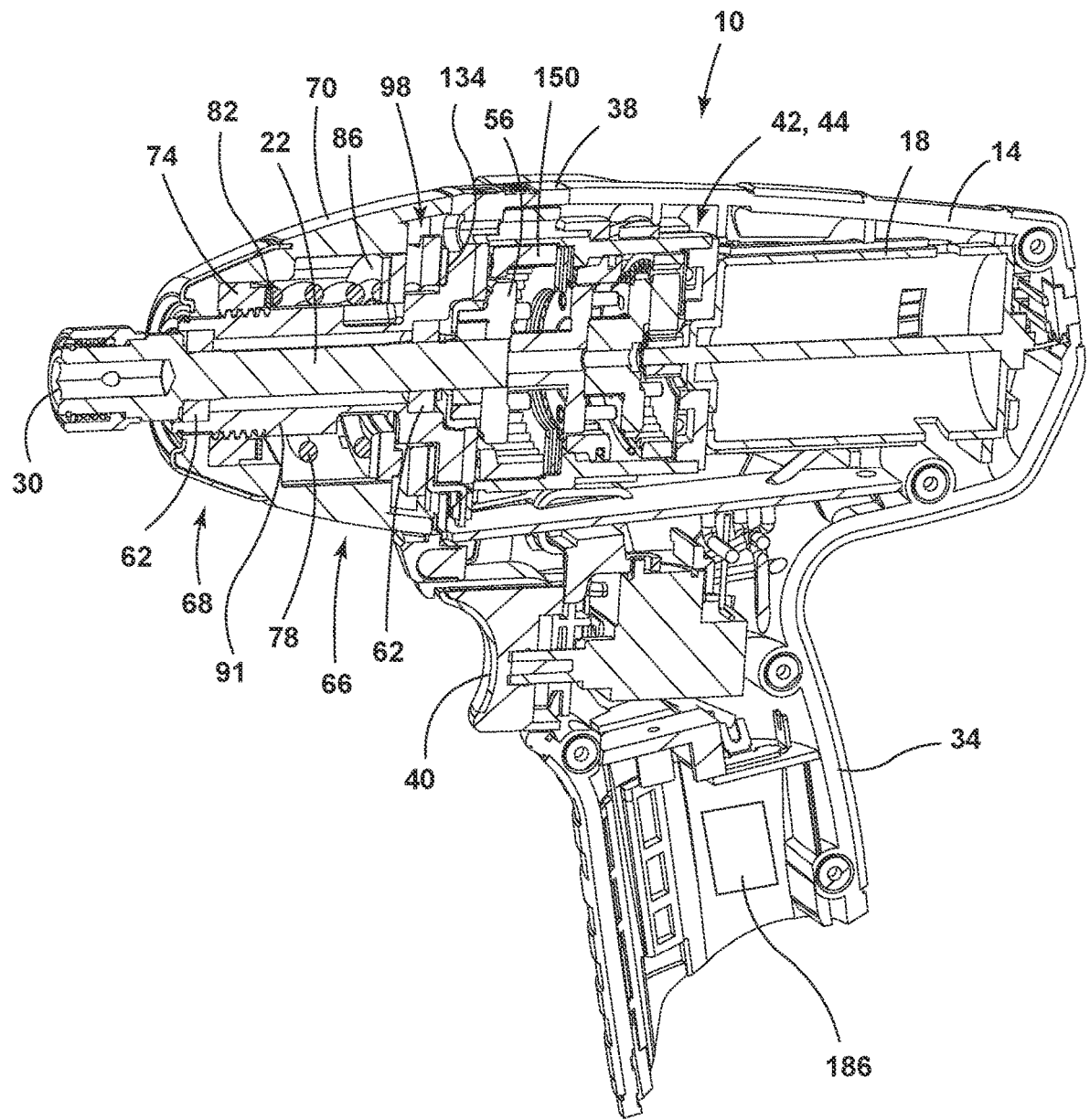
FIG. 2 is a cross-sectional view of the powered screwdriver along line 2-2 of FIG. 1, illustrating a clutch mechanism in a low torque setting.

FIG. 1 illustrates a power tool 10 (e.g., a powered screwdriver) including a housing 14, an electric motor (e.g., a brushless electric motor 18; FIG. 2) disposed within the housing 14, and an output shaft 22 which, either directly or indirectly, performs work on a workpiece during operation of the tool 10. The power tool 10 applies a precise amount of torque on a workpiece without over-tightening (i.e., over-torquing) the workpiece. The power tool 10 is powered by a battery pack 26. In other embodiments, the power tool 10 is powered using a power cord connected to an electrical source (e.g., wall outlet). Furthermore, the power tool 10 of the illustrated embodiment is a non-impact rotary tool, while in other embodiments, the power tool may alternatively be an impact rotary tool.

With continued reference to FIG. 1, the output shaft 22 includes a hexagonal receptacle 30 for receiving tool bits (not shown) that are capable of engaging a workpiece (e.g., fasteners). In other embodiments, the output shaft 22 may include a different configuration or the power tool 10 may include a conventional chuck for receipt of any number of different tools. The power tool 10 further includes a handle 34 and a gear case 38 coupled to the housing 14. The output shaft 22 extends beyond the gear case 38. The handle 34 is shaped to allow a user to easily grasp and operate the tool 10 via a trigger switch 40. The battery pack 26 connects to the handle 34 and selectively provides power to the motor 18 to drive a drive mechanism 42 of the power tool 10. In the illustrated embodiment, the battery pack 26 is partially insertable into the handle 34.

Figure 3:
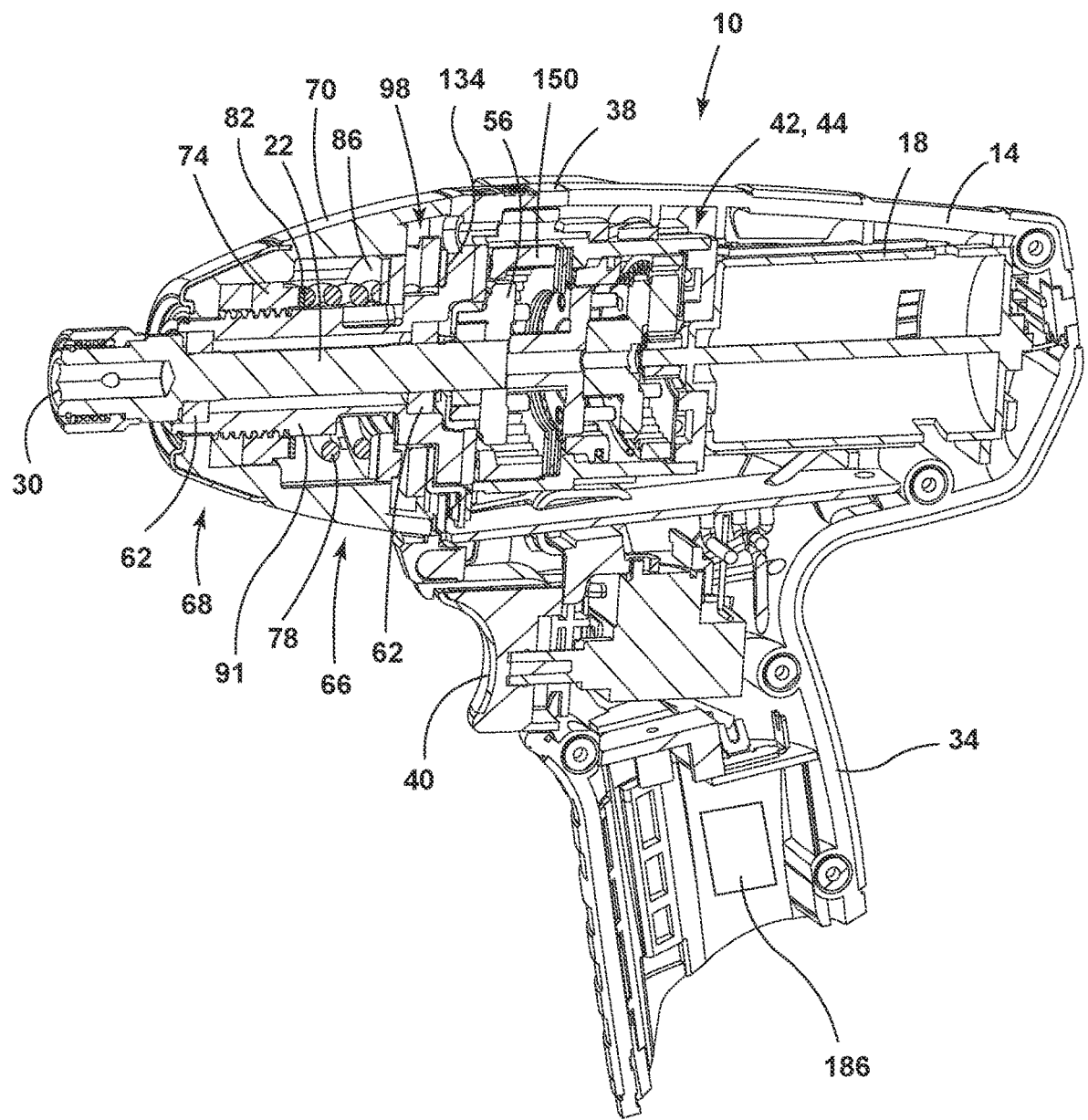
FIG. 3 is a cross-sectional view of the powered screwdriver along line 2-2 of FIG. 1, illustrating the clutch mechanism in a high torque setting.

With reference to FIGS. 2 and 3, the torque applied by the power tool 10 is adjustable. Depending on the application, the user may adjust the torque settings of the power tool 10, and thereby apply various and precise amounts of torque. In the illustrated embodiment, a user selects between a first (or low) torque setting as shown in FIG. 2, a second (or high) torque setting as shown in FIG. 3, or any level of torque between the low and high torque setting.

With continued reference to FIGS. 2 and 3, the drive mechanism 42 includes a transmission 44 at least partially positioned within the gear case 38. The transmission 44 includes a first stage gear set 50, a second stage gear set 52, and a third stage gear set 54. In the illustrated embodiment, the third stage gear set 54 includes an output carrier 56 that rotates with respect to the gear case 38 and planetary gears 58 rotatably supported upon the output carrier 56. The output carrier 56 is driven or rotated by the motor 18 of the power tool 10 via first and second stage gear sets 50, 52.

The output shaft 22 is coupled to the output carrier 56 and rotates in response to rotation of the output carrier 56. In the illustrated embodiment, drive shaft bearings 62 are positioned circumferentially around the output shaft 22. The drive shaft bearings 62 are disposed between the output shaft 22 and the gear case 38 to support the output shaft 22 for rotation relative to the gear case 38.

With continued reference to FIGS. 2 and 3, the power tool 10 further includes a clutch mechanism 66 and a clutch adjustment assembly 68. The clutch mechanism 66 operates between the first, low torque setting (FIG. 2) and the second, high torque setting (FIG. 3). During the low torque setting, the clutch mechanism 66 transmits a precise, low torque to the output shaft 22. During the high torque setting, the clutch mechanism 66 transmits a precise, high torque to the output shaft 22. The clutch mechanism 66 is also capable of operating at variable torque settings transmitting respective precise torques that are between the low torque setting and the high torque setting.

The clutch adjustment assembly 68 includes a collar 70 and a nut 74 coupled for co-rotation with the collar 70 but not axially affixed to the collar 70, as shown in FIGS. 2 and 3. The clutch mechanism 66 includes a clutch spring 78 and a pair of spring end plates 82, 86 disposed on opposite ends of the clutch spring 78. The illustrated clutch spring 78 is a compression spring, although in other embodiments, a different spring may alternatively be used such as a disc spring, a conical spring, or wave spring. The coil of the illustrated clutch spring 78 also includes a circular cross-sectional shape, whereas in other embodiments, the clutch spring 78 may alternatively have a square cross-sectional shape. The clutch spring 78 is positioned around the output shaft 22 and is compressed between the spring end plates 82, 86. Specifically, the clutch spring 78 includes a first end 88 (FIG. 5) that abuts the end plate 82 and a second end 90 that abuts the end plate 86. The clutch spring 78 has a relatively low stiffness to provide fine adjustment of compressive force through the clutch mechanism 66.

Figure 4:
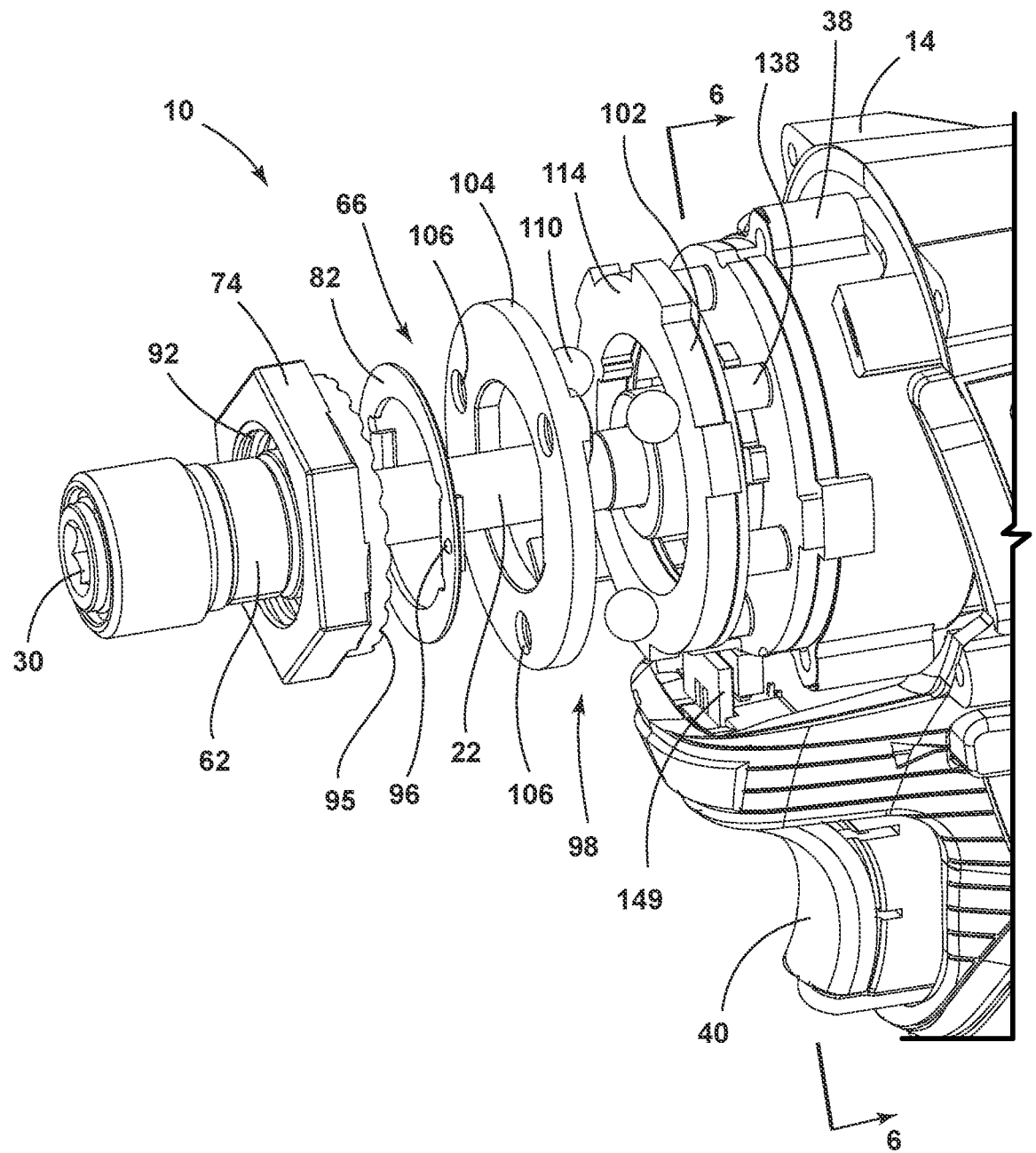
FIG. 4 is a detailed view of the powered screwdriver with a portion of the housing removed, illustrating a partially exploded view of the clutch mechanism.

The collar 70 is disposed circumferentially around a neck portion 91 of the gear case 38. The nut 74 is hex-shaped and is coupled for rotation with the collar 70. In other embodiments, the nut 74 may be spline-fit to the collar 70. The nut 74 is also threaded to the neck portion 91 of the gear case 38. Thus, the nut 74 is axially moveable relative to the collar 70 and the gear case 38. Specifically, the nut 74 includes internal threads 92 (FIG. 5) that engage with external threads 94 (FIG. 5) on the gear case 38, thereby allowing the nut 74 to rotate relative to the gear case 38 and translate along the neck portion 91. The nut 74 is axially moveable along the neck portion 91 of the gear case 38 between the low torque setting (FIG. 2) and the high torque setting (FIG. 3). In some embodiments, the threads 94 may be a fine helical pitch to provide for finer adjustment of compressive force of the clutch mechanism 66. The nut 74 includes a plurality of detents 95 that interface with bumps 96 on the spring end plate 82 (FIG. 4). As the nut 74 rotates relative to the spring end plate 82, the bumps 96 slide up and over adjacent detents 95, providing a tactile feedback when the user rotates the collar 70 through discrete torque setting positions.

With reference to FIGS. 2-6, the clutch mechanism 66 further includes a thrust washer assembly 98 to allow for movement (if any) between the clutch spring 78 and the gear case 38. Specifically, the thrust washer assembly 98 includes a first washer 102 (FIG. 4) that is rotationally constrained to the gear case 38 and a second washer 104 that is in sliding contact between the first washer 102 and spring end plate 86. The second washer 104 includes a plurality of pockets 106 that receive corresponding spherical rollers 110 for rolling along a flat face 114 of the first washer 102. The clutch spring 78 is compressed between the nut 74 and the thrust washer assembly 98, which places the neck portion 91 of the gear case 38 in tension. Although the thrust washer assembly 98 is incorporated in this embodiment, in other embodiments, the thrust washer assembly 98 may be omitted.

Figure 5:
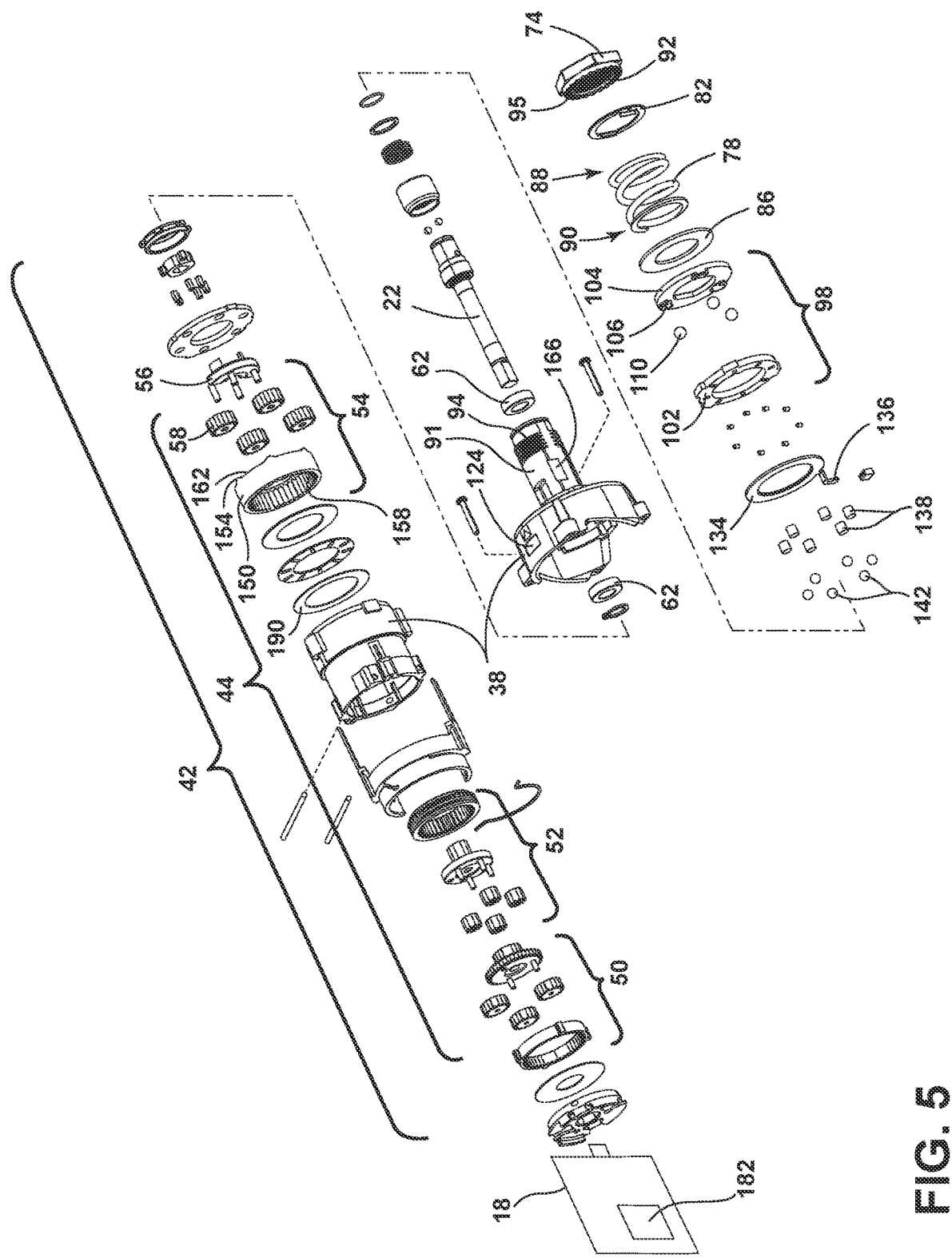
FIG. 5 is an exploded perspective view of a portion of the powered screwdriver, illustrating a drive mechanism and the clutch mechanism.

When a user selects the desired torque setting, the clutch adjustment assembly 68 is inhibited from intentional or inadvertent adjustment by a lockout feature 124 (FIG. 5). The lockout feature 124 mechanically interferes with the collar 70 to inhibit rotational movement thereof. The lockout feature 124 is, for example, coupled to the gear case 38 and selectively interferes with the collar 70, so that the collar 70 is no longer capable of rotating relative to the gear case 38. The lockout feature 124 is actuated either manually or automatically. That is, a user can manually actuate the lockout feature 124 between a lockout state, in which the collar 70 is inhibited from rotational movement, and a released state, in which the collar 70 is capable of rotational movement. Alternatively, the power tool 10 may automatically actuate the lockout feature 124 between the lockout state and the released state. In other embodiments, when a user pulls the trigger switch 40 and the tool 10 does not activate, the lockout feature 124 may simply provide the user with a visual or audible indication when the torque setting of the tool 10 differs from the designated torque setting in a mobile application (e.g., OneKey® app). In this case, the power tool 10 or mobile application may have a confirmation button (physical or touch screen) which must be activated to confirm that the user intended to adjust the clutch adjustment assembly 68. Still, in other embodiments, the lockout feature 124 may alternatively be an electromechanical lockout, where an electronic switch or the mobile application can actuate the lockout feature 124 between the lockout state and the released state.

Figure 6:
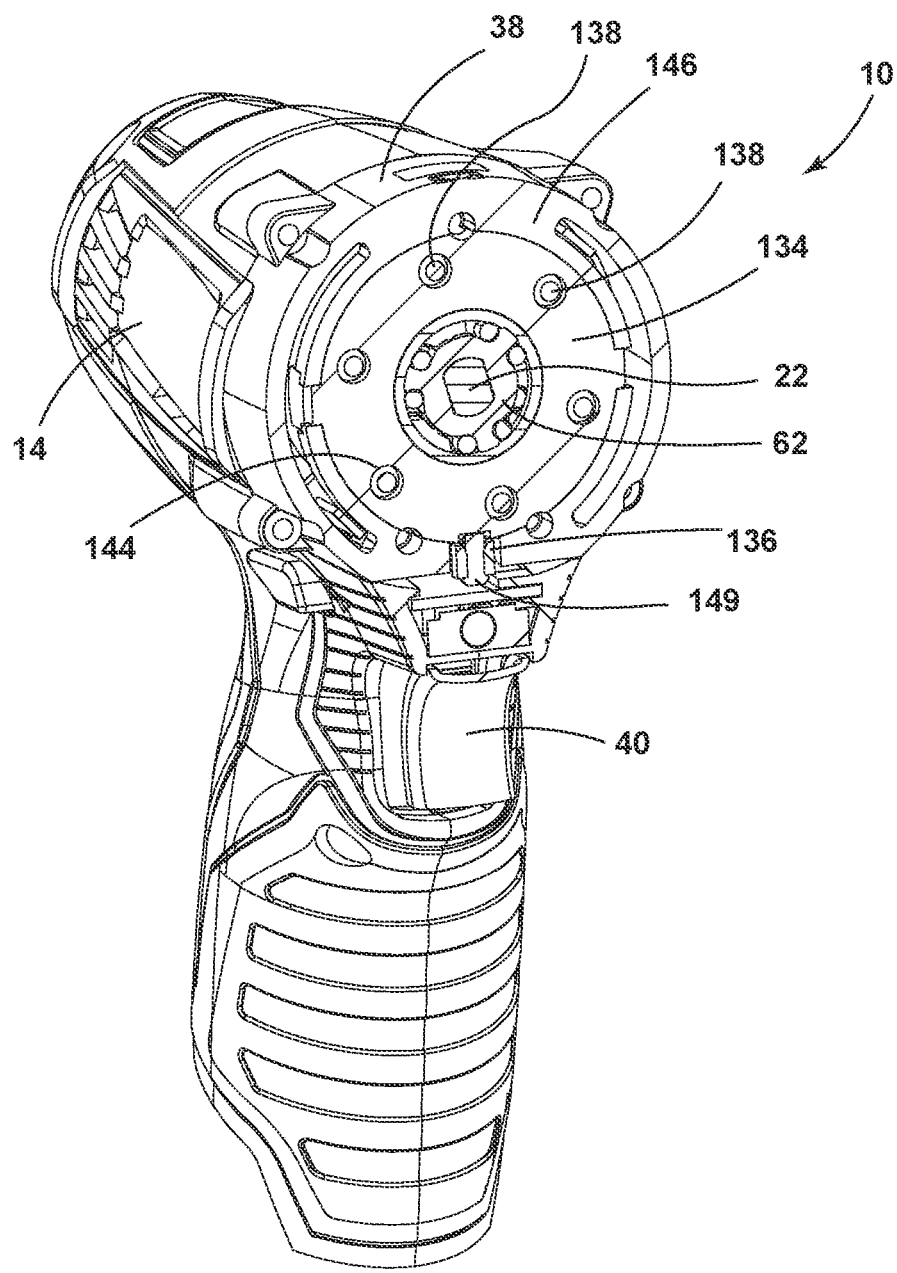
FIG. 6 is a sectional view of the powered screwdriver along line 6-6 of FIG. 4, illustrating a portion of the clutch mechanism.
Figure 7:
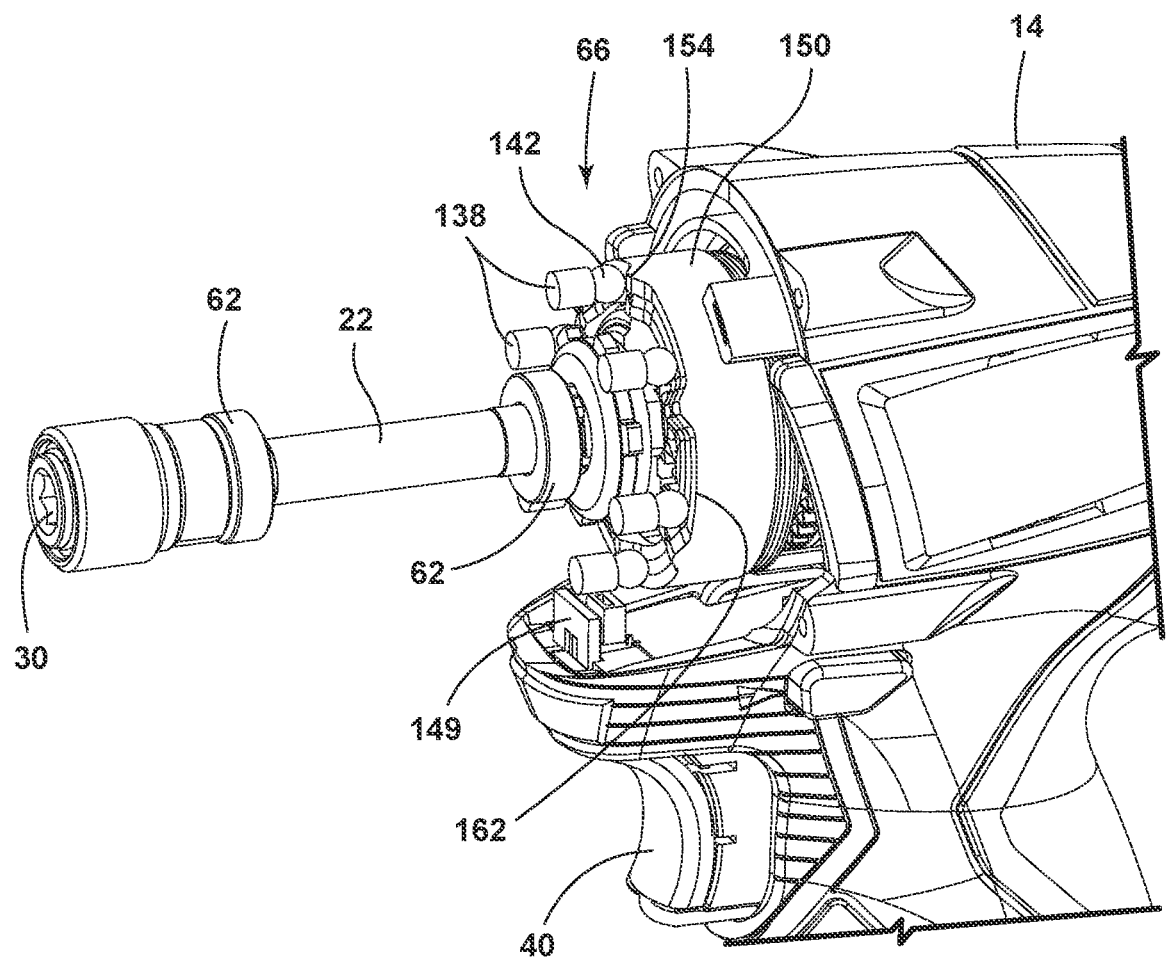
FIG. 7 is a detailed view of the powered screwdriver with a portion of the housing removed, illustrating a portion of the clutch mechanism.
Figure 8:
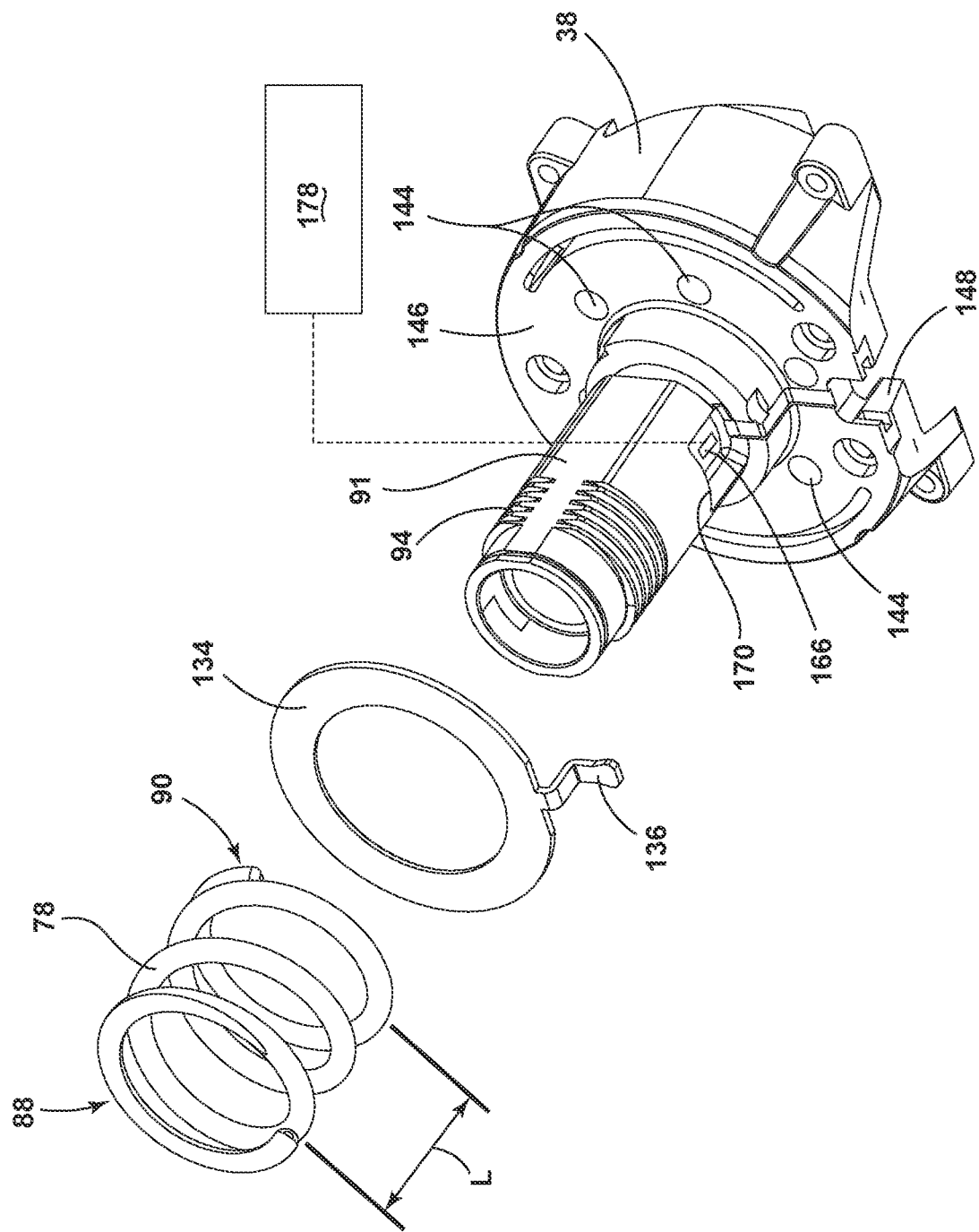
FIG. 8 is an exploded perspective view of the powered screwdriver, illustrating a main clutch sensor of the clutch mechanism.
Figure 9:
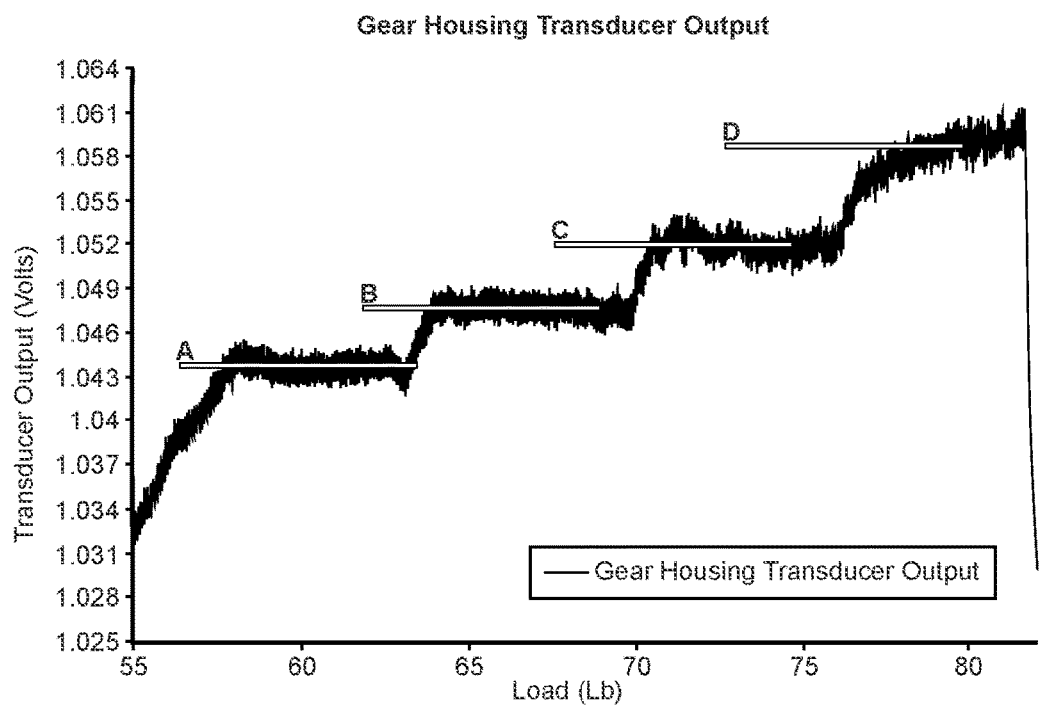
FIG. 9 is a graphical illustration of a signal output from a main clutch sensor of the amount of strain exerted on a gear case as the clutch mechanism transitions between various torque settings.

With reference to FIGS. 5-8, the clutch mechanism 66 further includes a washer 134 that is circumferentially disposed around the neck portion 91 of the gear case 38 and encompassed by the collar 70. The washer 134 interfaces with a series of pins 138 and balls 142 (FIGS. 5 and 6) disposed within corresponding apertures 144 of the gear case 38 (FIG. 9). The series of pins 138 and the series of balls 142 are axially aligned within the apertures 144. The compressive force from the clutch spring 78 is imparted through the thrust washer assembly 98 and to the washer 134. The washer 134 then transfers the compressive force of the clutch spring 78 through to the series of pins 138 and the series of balls 142 during a clutching event, as described in further detail below. Otherwise, the washer 134 simply presses against a front face 146 of the gear case 38 (FIGS. 6 and 8).

With reference to FIGS. 5-8, the washer 134 includes an L-shaped tab or arm 136 extending from the outer peripheral surface of the washer 134. The arm 136 is received within a slot 148 in the front face 146 of the gear case 38. The arm 136 is capable of contacting a switch 149 (FIG. 7) when the washer 134 is displaced from the front face 146 of the gear case 38 during a clutching event, as described in further detail below.

With continued reference to FIGS. 5-8, the clutch mechanism 66 further includes a ring gear 150 with a series of projections 154 that extend axially therefrom towards the series of balls 142. The ring gear 150 of the third stage gear set 54 includes teeth 158 (FIG. 5) that mesh with the planetary gears 58, which drives the output carrier 56 and the output shaft 22. The ring gear 150 is capable of rotating relative to the gear case 38. During normal operation, the series of balls 142 engage a flat rim 162 of the ring gear 150 and jam against the projections 154, such that the ring gear 150 is rotationally fixed and torque is transferred from the motor 18 to the output shaft 22. However, during a clutching event, the ring gear 150 rotates (or slips) relative to the gear case 38, such that the projections 154 slide past the series of balls 142 thereby imparting an axial displacement to the series of pins 138 and the washer 134 against the bias of the clutch spring 78. This occurs when the reaction torque applied to a workpiece exceeds the compressive force of the clutch spring 78. The projections 154 will continue to slide past the series of balls 142, so long as the reaction torque on the output shaft 22 exceeds the compressive force of the clutch spring 78. Should an operator of the power tool 10 decide to adjust the tool 10 to a higher or lower torque setting, the operator simply adjusts the collar 70 to increase or decrease the compressive force (i.e., preload) exerted by the clutch spring 78.

With reference to FIG. 8, the power tool 10 includes a main clutch sensor 166 disposed within a cavity 170 of the gear case 38. Specifically, the main clutch sensor 166 is disposed at the base of the neck portion 91, which is an area that resists bending but is susceptible to strain in tension. The sensor 166 may be configured as one or more strain gauges. If multiple strain gauges are used, they may be arranged in a Wheatstone bridge, for example. The sensor 166 detects strain imparted to the neck portion 91 of the gear case 38, which is proportional to the preload of the clutch spring 78. As such, the amount of strain exerted on the neck portion 91 increases as the preload of the clutch spring 78 increases (via the nut 74 and its threaded connection to the neck portion 91). This relationship can be used to determine torque settings without relying upon discrete predefined torque settings on the collar 70, which may become inaccurate with long-term use of the tool due to wear in the clutch mechanism 66. In some embodiments, there may a plurality of sensors 166 to provide robustness against detecting other deformation caused by for example, bending stresses, shear stresses, and temperature expansion/contraction stresses.

With reference to FIGS. 8 and 9, the power tool 10 includes a user interface 178 to provide real-time feedback indicating the torque setting at which the power tool 10 is set. The torque setting that is displayed to the user through the user interface 178 is based on mapping the strain signals produced by the sensor 166 when the clutch spring 78 is set to a variety of preloads between (and including) the low torque setting and high torque setting. As illustrated in FIG. 9, the main clutch sensor 166 detects the amount of strain exerted on the neck portion 91 when the clutch mechanism 66 is at various torque settings and outputs a corresponding signal (e.g., level A, B, C, D). That is, each level A, B, C, D indicates a discrete position of the clutch mechanism 66, which produces a different strain signal in the main clutch sensor 166. Although the strain signals produced in the illustrated embodiment are discrete, in other embodiments, the force signals produced could be continuous if the clutch mechanism 66 provides a user with infinite levels of torque settings between the high torque setting and the low torque setting. The user interface 178 may be provided on an external device, such as a smart phone. In addition or alternatively to the user interface 178, the power tool 10 may include one or more user feedback LEDs (light emitting diodes) or LCDs (liquid crystal display) 179 (FIG. 1) positioned at the top of the tool 10 or other locations visible to the user during operation of the tool 10.

With reference to FIG. 5, the power tool 10 may also include a current sensor 182 that monitors the electrical current drawn by the motor 18, which is also proportional to torque output of the motor 18. A motor control unit, or MCU 186, disposed within the handle 34 (FIG. 2) receives and compares the motor current signal from the current sensor 182 and the strain signal from the main clutch sensor 166 to determine the accuracy of the strain signal. Accuracy of the strain signals can, for example, change over the life of the tool due to normal wear of the clutch spring 78 or any other component of the clutch mechanism 66. Thus, the motor current signals provide a first reference signal (or first default signal) for the MCU 186 to compare to the force signals. In response to a large variance or deviation between the first reference signal (e.g., the motor current signals) and the strain signals, the user interface 178 may prompt the user to adjust the clutch mechanism 66 or recalibrate the power tool 10 to eliminate any overshoot or undershoot of torque delivered by the tool 10.

For example, the first reference signal may be higher or lower than the strain signal from the main clutch sensor 166, at which point the user can adjust the clutch mechanism 66 or recalibrate the tool, as described in more detail below. In addition or alternatively to the motor current sensor 182, a load cell or transducer 190 (FIG. 5) may be provided on or adjacent the ring gear 150 to provide a second reference signal (or second default signal) to the MCU 186. The transducer 190 may be similar to the disclosed transducer assembly identified as reference number 54 in FIG. 4 of U.S. Pat. No. 10,357,871, the entire content of which is incorporated herein by reference. The second reference signal is in the form of a strain signal indicating the amount of rotational strain exerted on the ring gear 150, which is proportional to the reaction torque exerted on the tool bit. The first reference signal and the second reference signal are indicative of real-time feedback of components experiencing strain. Thus, the MCU 186 may compare the first reference signal and the second reference signal to determine accuracy of the strain signal produced by the main clutch sensor 166.

In the event the user interface 178 prompts the user to recalibrate the power tool 10, the user may enter a calibration setting of the tool 10. In the calibration setting, the user may calibrate the tool 10 by first mechanically adjusting the torque setting of the tool 10 via the clutch adjustment assembly 68. The tool 10 subsequently provides an original estimate of the approximate torque that the clutch mechanism 66 will experience a clutching event. Then, the user activates the tool 10 while being monitored by a test device (not shown) that audits the performance of the tool 10. The test device provides an adjustment factor to account for the difference between the original estimate and the actual performance. At this point, the adjustment factor is stored in the MCU 186, so the original estimate provided by the user interface 178 is accurate to the actual performance.

In other embodiments, the manufacturer may alternatively calibrate the power tool 10. For example, the manufacturer measures the maximum torque output by the power tool 10 at the high torque setting. The maximum torque output is determined when the power tool 10 is in the high torque setting and experiences a clutching event. Similarly, the manufacturer measures the minimum torque output by the power tool 10 at the low torque setting. The minimum torque output is determined when the power tool 10 is in the low torque setting and experiences a clutching event. The torque output at each discrete torque setting between the high torque setting and the low torque setting is also determined, at which point the mapping is stored in the tool 10.

Still, in other embodiments, the power tool 10 may simply be calibrated by a comparison between the force signals generated by the main clutch sensor 166, and the first and second reference signals. Specifically, once the tool 10 is in the calibration setting, the tool 10 is activated to drive a workpiece, at which point the MCU 186 records the signals from the motor current sensor 182 and the transducer 190. Upon detection of a large variance or deviation between the first reference signal (e.g., the motor current signals) and the force signals, or the second reference signal (e.g., the strain signals) and the force signals, the MCU 186 records an adjustment factor so the user interface 178 can display the correct torque setting.

To operate the torque tool in the low torque setting (FIG. 2), the user engages the output shaft 22 to an object, for example, a fastener. As the motor 18 begins to rotate, the third gear set 54 transmits torque to the output carrier 56 via the clutch mechanism 66. The output shaft 22 coupled to the output carrier 56 rotates and accordingly torques the fastener. Once the low torque is reached, the torque imparted through the output shaft 22 overcomes the compressive force of the clutch mechanism 66. This results in sliding or slipping of the ring gear 150 past the series of balls 142.

Specifically, when the ring gear 150 rotates relative to the gear case 38, the projections 154 slide past the series of balls 142, at which point the apex of the projections 154 axially displace the series of balls 142 and the series of pins 138 through the apertures 144. This displacement also causes the washer 134 to displace, such that the arm 136 contacts (e.g., directly, electrically, etc.) the switch 149. The switch 149 then relays a signal to the MCU 186 that a clutching event has occurred.

When the power tool 10 experiences this clutching event, torque provided to the workpiece by the output shaft 22 is terminated. That is, the power tool 10 is deactivated upon detection of a single clutching event. When a clutching event occurs within the clutch mechanism 66, the motor current signals detected by the motor current sensor 182 changes abruptly. This abrupt change in the motor current signals is relayed from the motor current sensor 182 to the MCU 186, at which point the power tool 10 is deactivated via the MCU 186. Thus, when the power tool 10 is in the low torque setting, the output shaft 22 is able to precisely apply the low torque to the fastener and cannot apply torque beyond the low torque setting to the fastener due to deactivation of the power tool 10 upon sensing a clutching event. In some embodiments, the signal sent to the MCU 186 by the switch 149 may also or alternatively cause to the power tool 10 to deactivate.

With reference to FIG. 3, the clutch mechanism 66 is actuated to the high torque setting by rotating the collar 70 and thereby translating the nut 74 to compress the clutch spring 78. In the illustrated embodiment, the collar 70 is rotated until the nut 74 is translated into the high torque setting. The collar 70 stops rotating when the nut 74 reaches the high torque setting to signify that the clutch mechanism 66 is set in the high torque setting. The nut 74 compresses the clutch spring 78 and thereby applies a greater compressive force against the thrust washer assembly 98 and washer 134.

To operate the power tool 10 in the high torque setting (FIG. 3), the user engages the output shaft 22 to an object, for example, a fastener. As the motor 18 begins to rotate, the third gear set 54 transmits torque to the output carrier 56 via the clutch mechanism 66. The output shaft 22 coupled to the output carrier 56 rotates and accordingly torques the fastener. Once the high torque is reached, the torque imparted through the output shaft 22 overcomes the compressive force of the clutch mechanism 66. This results in sliding or slipping of the ring gear 150 past the series of balls 142.

Specifically, when the ring gear 150 rotates relative to the gear case 38, the projections 154 slide past the series of balls 142, at which point the apex of the projections 154 axially displace the series of balls 142 and the series of pins 138 through the apertures 144. This displacement also causes the washer 134 to displace, such that the arm 136 contacts the switch 149. The switch 149 then relays a signal to the MCU 186 that a clutching event has occurred.

When the power tool 10 experiences this clutching event, torque provided to the workpiece by the output shaft 22 is terminated. That is, the power tool 10 is deactivated upon detection of a single clutching event. When a clutching event occurs within the clutch mechanism 66, the motor current signal detected by the motor current sensor 182 changes abruptly. This abrupt change in the motor current signals is relayed from the motor current sensor 182 to the MCU 186, at which point the power tool 10 is deactivated via the MCU 186. Thus, when the power tool 10 is in the high torque setting, the output shaft 22 is able to precisely apply the high torque to the fastener and cannot apply torque beyond the high torque setting to the fastener due to deactivation of the power tool 10 upon sensing a clutching event. In some embodiments, the signal sent to the MCU 186 by the switch 149 may also or alternatively cause to the power tool 10 to deactivate.

To return the power tool 10 to the low torque setting, the user rotates the collar 70 until the nut 74 is translated to the low torque setting (FIG. 2). In the low torque setting, the nut 74 is positioned to allow the clutch spring 78 to expand to a length nominally greater than its compressed length in the high torque setting.

In a further embodiment, the power tool 10 is operated at variable torque settings by rotating the collar 70 to translate the nut 74 to particular positions between the low torque setting (FIG. 2) and the high torque setting (FIG. 3). The clutch spring 78 is compressed a different amount in each of the discrete positions, which generates corresponding compression forces on the thrust washer assembly 98 and the washer 134. The clutch mechanism 66 thereby generates different, precise torque outputs at each of the torque settings.

In a further embodiment, the power tool 10 is operated at variable torque settings by changing the compression of the clutch spring 78 electronically using an electro-active polymer material, a linear actuator, or a hydraulic actuator. The electro-active polymer material, for example, surrounds the clutch spring 78 and changes size (e.g., deforms) when stimulated by an electric field, thereby allowing the compression of the clutch spring 78 to change in response to deformation of the electro-active polymer material. In such embodiments, the clutch spring 78 and collar 70 may be omitted, and adjustments of the clutch mechanism 66 may be made electronically (e.g., using the user interface 178)

In yet other embodiments, the power tool 10 is operated at variable torque settings by changing the compression of the clutch spring 78 using the motor 18. Normally, the motor 18 only drives the output shaft 22, but such alternate embodiments, a user may deviate the application of torque of the motor 18 from the output shaft 22 to the clutch spring 78. That is, a shifting mechanism may be provided to selectively couple the motor 18 to the clutch spring 78 such that the motor 18 may be activated to vary the compression of the clutch spring 78. Instead of adjusting the collar 70, a user would simply actuate the shifting mechanism to a clutch adjusting mode, and then depress the trigger switch 40 to activate the motor 18 and compress/decompress the clutch spring 78.

Although the switch 149 may send a signal to the MCU 186 to deactivate the power tool 10 upon a clutching event, in other embodiments, a similar type of sensor may alternatively be disposed adjacent the clutch spring 78, the spring end plate 86, the thrust washer assembly 98, the series of pins 138, and/or the series of balls 142 to detect axial displacement thereof. Axial displacement of any component in the clutch mechanism 66 is indicative that the series of balls 142 are being displaced by the projections 154 of the ring gear 150 during the clutching event.

The MCU 186 may also be set to deactivate the power tool 10 at a detected torque that is a certain percentage greater than the target torque set by the clutch mechanism 66. For example, if a user sets the target torque to 100 ft-lbs via the clutch mechanism 66 and caps the overshoot potential to 10%, then the power tool 10 can automatically shut down the power tool 10 when the power tool 10 experiences a reaction torque of 110 ft-lbs. In some embodiments, the user can cap the overshoot potential to 5%, 10%, or any value within the capability of the clutch where the variation in the output would include the variation in the clutch.

FIGS. 10-13 illustrate a main clutch sensor 466 according to another embodiment of the invention. The main clutch sensor 466 shown in FIGS. 10-13 is like the main clutch sensor 166 of the power tool 10 shown in FIGS. 1-9, with like structure being identified with similar reference numerals plus 300. The main clutch sensor 466 can detect the compressed length of the spring 378 to determine the preload of the clutch spring 378, which is then communicated to the user in the form of a torque setting of the clutch mechanism 366.

Figure 10:
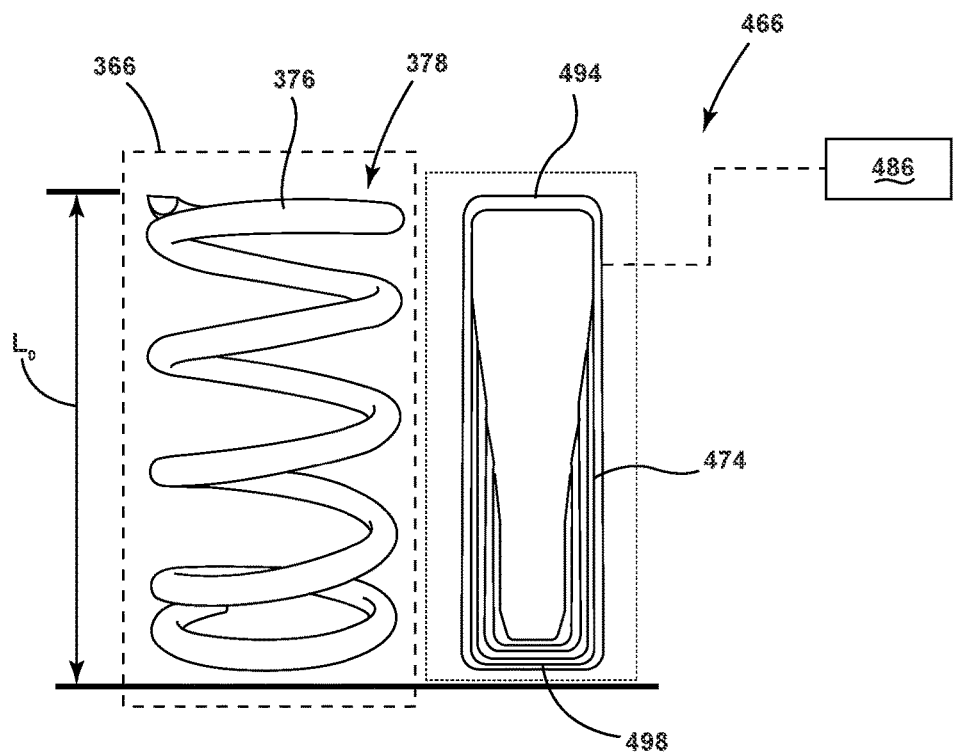
FIG. 10 is a plan view of an alternative embodiment of the main clutch sensor, illustrating a clutch spring of the clutch mechanism in the low torque setting.
Figure 14:
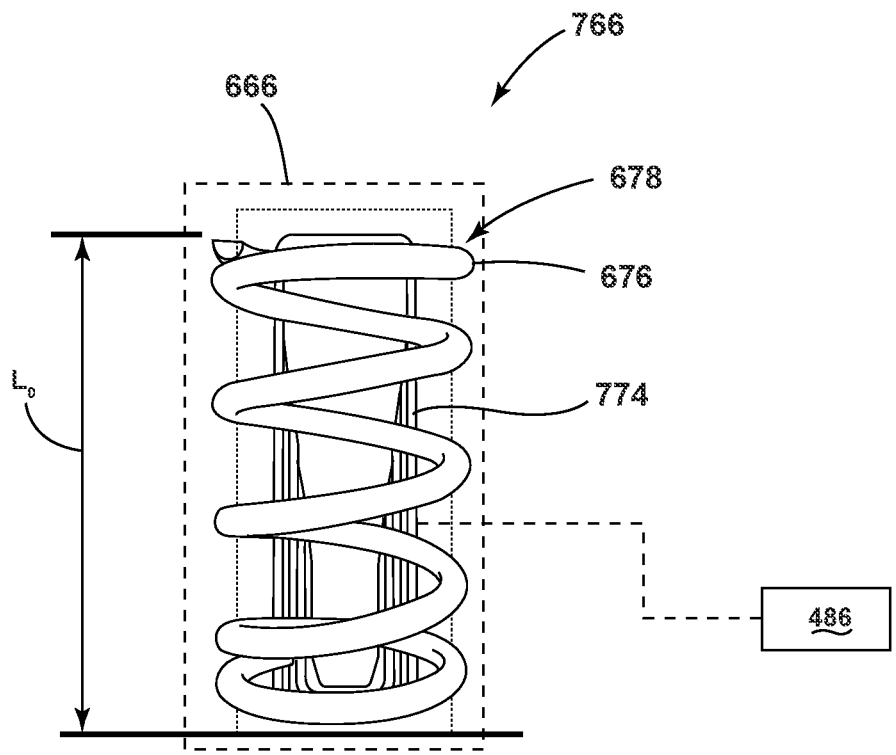
FIG. 14 is a plan view of an alternative embodiment of the main clutch sensor in FIG. 10, illustrating the clutch spring of the clutch mechanism in the low torque setting.

With reference to FIG. 10, the main clutch sensor 466 includes an inductive sensor 474 and a conductor or target 376. In this embodiment, the conductor 376 is the clutch spring 378, and the conductor 376 is disposed adjacent and offset from the inducive sensor 474. In other embodiments, such as illustrated in FIG. 14, a main clutch sensor 766 includes a conductor or target 676 (e.g., spring 678) that is circumferentially disposed around the inductive sensor 774 instead of being located parallel with the inductive sensor 774.

With reference back to FIG. 10, the inductive sensor 474 includes a first end 494 and a second end 498 that is opposite the first end 494. The inductive sensor 474 can communicate induction signals to an MCU 486. The inductive sensor 474 is configured having coil traces. When an AC voltage is applied to the sensor 474, an electromagnetic field is created. Based on Faraday's Law of Induction, a voltage will be induced in the conductor 376 in response to relative movement between the conductor 376 and the magnetic fields of the inductive sensor 474 which, in turn, produces Eddy currents in the conductor 376 that oppose the electromagnetic field created by the inductive sensor 474. This changes the inductance of the inductive sensor 474, which can be measured and used as an indicator of the compressed length L (i.e., $L_0$, $L_1$, $L_2$) of the spring 378. Although not schematically illustrated in FIG. 10, the inductive sensor 474 is configured as an LC tank circuit, the frequency of which (hereinafter, the "inductive signal") changes in response to a change in inductance.

Figure 15:
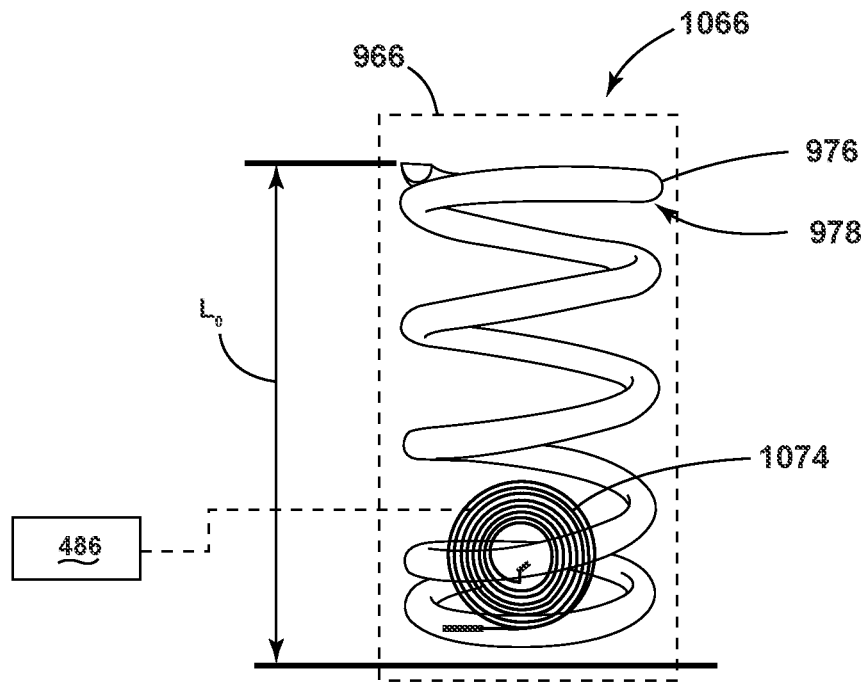
FIG. 15 is a plan view of another alternative embodiment of the main clutch sensor in FIG. 10, illustrating the clutch spring of the clutch mechanism in the low torque setting.

As shown in FIG. 10, the inductive sensor 474 is a linear inductive sensor having a non-uniform winding density along the length of the inductive sensor 474. In other words, the inductive sensor 474 includes a relatively low winding density at the first end 494 of the sensor 474 and a relatively high winding density at the second end 498 of the sensor 474. The measured change in inductance of the sensor 474 in response to movement of the conductor 376 (e.g., the clutch spring 378) relative to the inductive sensor 474 can be used to indicate to the user in which torque setting the power tool 10 is set. In other embodiments, such as illustrated in FIG. 15, a main clutch sensor 1066 includes an inductive sensor 1074 that may alternatively have a uniform winding density, such that the number or density of windings throughout the length (or diameter) of the sensor is the same.

With reference to FIGS. 10-13, the signal output by the inductive sensor 474 changes as the clutch spring 378 compresses. For example, when the compressed length L of the clutch spring 378 (or conductor 376) is at $L_0$ (FIG. 10), the inductive sensor 474 relays an inductive signal to the MCU 486 that corresponds to the coil density of the clutch spring 378 at $L_0$. Similarly, when the compressed length L of the clutch spring 378 (or conductor 376) is at $L_1$ (FIG. 11), the inductive sensor 474 relays an inductive signal to the MCU 486 that corresponds to the coil density of the clutch spring 378 at $L_1$. The inductive signal corresponding to the coil density when the clutch spring 378 at $L_2$ (FIG. 12), or any other length, is also sent to the MCU 486. The MCU 486 is pre-programmed to output to the user interface 178 a torque setting of the power tool 10 that corresponds to the inductive signal that is generated for each compressed length L.

In operation of the power tool 10 using the embodiment of the main clutch sensor 466, 766, 1066 shown in FIGS. 10-15, a user adjusts the torque setting via the clutch mechanism 366, 666, 966, causing the conductor 376, 676, 976 (e.g., spring 378, 678, 978) to compress. When the compressed length L decreases, the coil density of the conductor 376, 676, 976 increases, thereby causing the output (e.g., inductive signal) of the inductive sensor 474, 774, 1074 to change proportionately. The inductive signal is relayed to the MCU 486, where the signal is processed to determine which compressed length L correlates to the signal. Once the MCU 486 determines the compressed length L via the inductive signal received, the preload (or specific torque setting) is interpolated and displayed to the user via the user interface 178. For example, the inductive sensor 474, 774, 1074 relays a first inductive signal to the MCU 486 when the conductor 376, 676, 976 is at length $L_0$ (FIG. 10), where the MCU 486 correlates the first inductive signal to length $L_0$ meaning that the clutch mechanism 366, 666, 966 is in the low torque setting. The user interface 178 subsequently informs the user that the power tool 10 is in the low torque setting. When the operator adjusts the torque setting to the high torque setting (or some incremental torque setting between the low and high torque setting) via the clutch mechanism 366, 666, 966, the conductor 376, 676, 976 (e.g., spring 378, 678, 978) compresses further. This compression causes a change in the inductive signal generated by the inductive sensor 474, 774, 1074. A second inductive signal is relayed to the MCU 486 when the conductor 376, 676, 976 is at length $L_2$ (FIG. 12), at which point the MCU 486 correlates the second inductive signal to length $L_2$ meaning that the clutch mechanism 366, 666, 966 is in the high torque setting.

In the calibration setting, the user may calibrate the tool 10 by first mechanically adjusting the torque setting of the tool 10 via the clutch adjustment assembly 68, for example, to the high torque setting. The maximum torque output is determined when the power tool 10 is in the high torque setting and experiences a clutching event. Then, the user mechanically adjusts the torque setting of the tool 10 via the clutch adjustment assembly 68 to the low torque setting. The minimum torque output is determined when the power tool 10 is in the low torque setting and experiences a clutching event. The tool 10 now has stored two points (e.g., a low point and a high point), at which point linear interpolation may be used to self-calibrate the tool 10 using inductive based measurements via the inductive sensor 474, 774, 1074.

Figure 16:
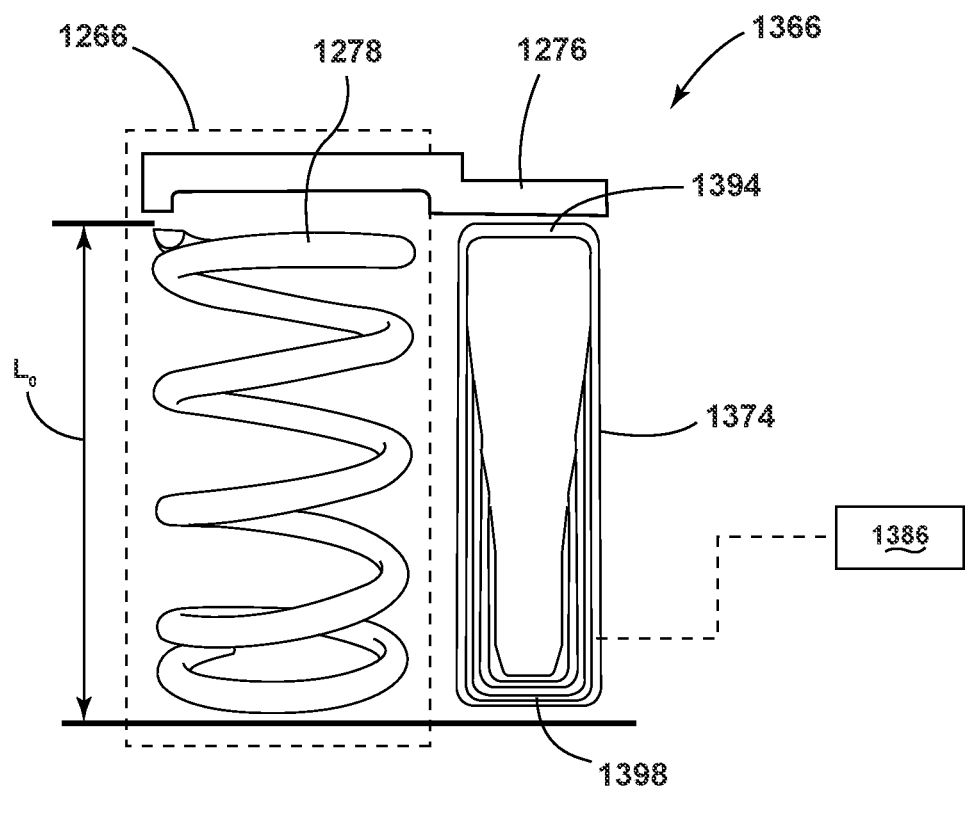
FIG. 16 is a plan view of yet another alternative embodiment of the main clutch sensor in FIG. 10, illustrating a clutch spring of the clutch mechanism in the low torque setting.

FIG. 16 illustrates a main clutch sensor 1366 according to another embodiment of the invention. The main clutch sensor 1366 shown in FIG. 16 is like the main clutch sensor 466 of the power tool 10 shown in FIGS. 10-13, with like structure being identified with like reference numerals plus "900."

With reference to FIG. 16, the main clutch sensor 1366 includes an inductive sensor 1374 and a conductor or target 1276. In this embodiment, the conductor 1276 is coupled to and cantilevered from the clutch spring 1278, and overlaps with the inductive sensor 1374. That is, the clutch spring 1278 is disposed adjacent and offset from the main clutch sensor 1366, while the conductor 1276 is aligned with and overlaps the main clutch sensor 1366. The inductive sensor 1374 includes a first end 1394 and a second end 1398 that is opposite the first end 1394. The conductor 1276 is comparatively narrow to the inductive sensor 1374, allowing precise detection of exactly where the conductor 1276 is located relative to the inductive sensor 1374. Specifically, the inductive sensor 1374 can detect whether the conductor 1276 is disposed adjacent the first end 1394, adjacent the second end 1398, or disposed somewhere between the first end 1394 and the second end 1398. In some embodiments, the conductor 1276 is the nut 74, such that movement of the nut 74 causes a change in inductance of the sensor 474 which can be measured to indicate to the user in which torque setting the power tool 10 is set.

Figure 17:
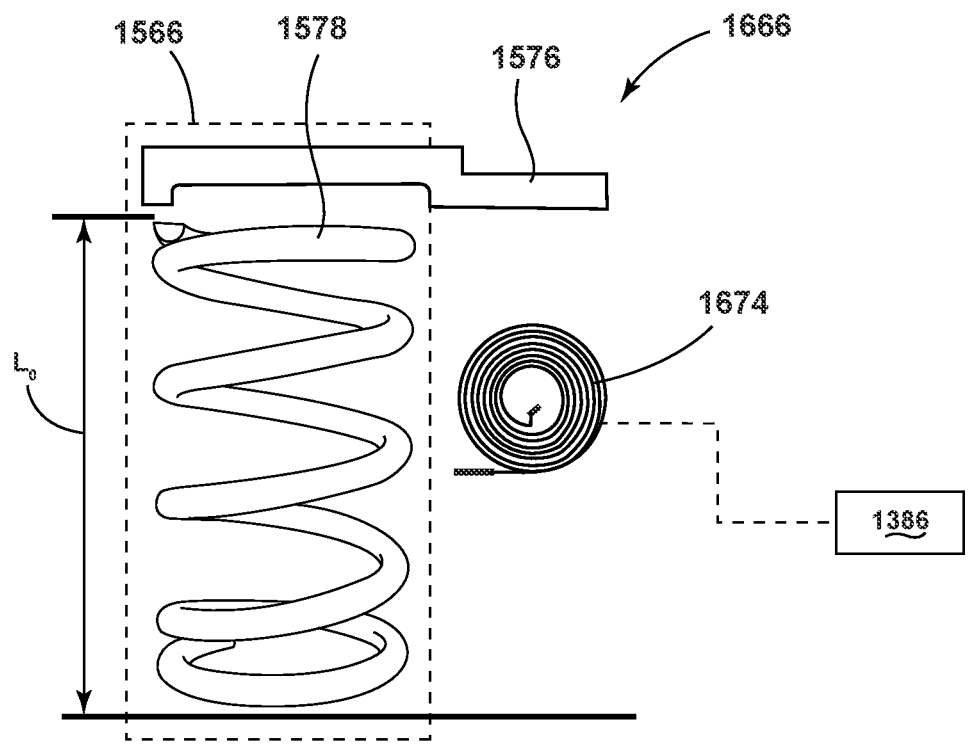
FIG. 17 is a plan view of still yet another alternative embodiment of the main clutch sensor in FIG. 10, illustrating a clutch spring of the clutch mechanism in the low torque setting.
Figure 18:
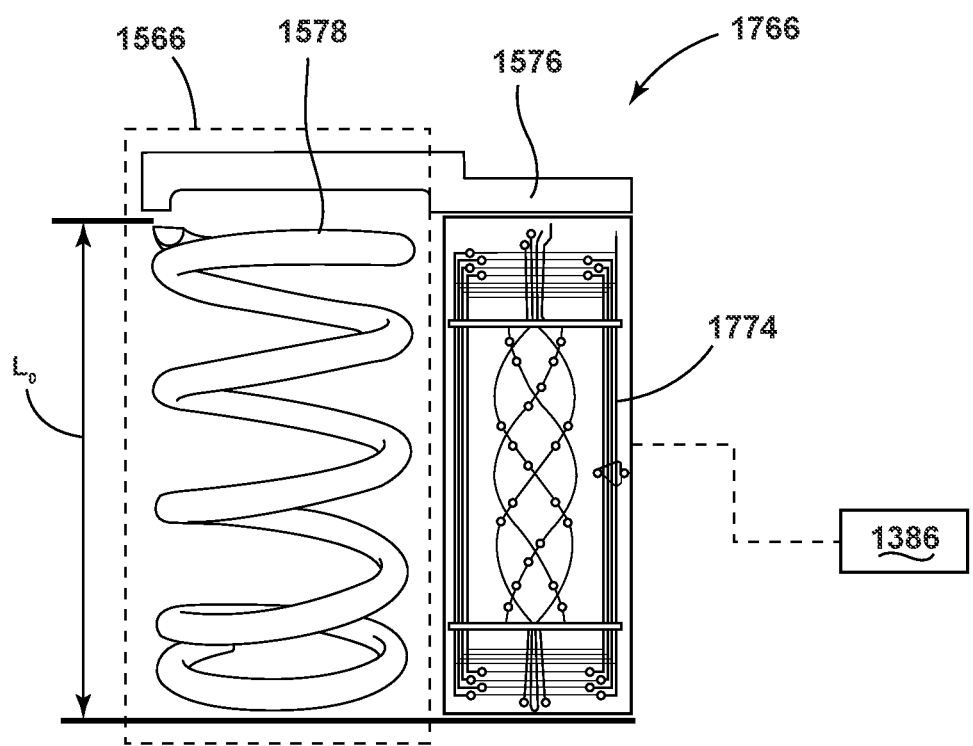
FIG. 18 is a plan view of still yet another alternative embodiment of the main clutch sensor in FIG. 10, illustrating a clutch spring of the clutch mechanism in the low torque setting.

As shown in FIG. 16, the inductive sensor 1374 is a linear inductive sensor having a non-uniform winding density along the length of the inductive sensor 1374. In other words, the inductive sensor 1374 includes a relatively low winding density at the first end 1394 of the sensor 1374 and a relatively high winding density at the second end 1398 of the sensor 1374. In other embodiments, such as illustrated in FIG. 17, a main clutch sensor 1666 includes an inductive sensor 1674 that may alternatively have a uniform winding density, such that the number or density of windings throughout the length (or diameter) of the sensor is the same. Still, in other embodiments, such as illustrated in FIG. 18, a main clutch sensor 1766 includes an inductive sensor 1774 that may alternatively have a sinusoidal and cosinusoidal geometry. In this embodiment of the main clutch sensor 1366, the measured change in inductance of the sensor 1374 in response to movement of the conductor 1276 relative to the sensor 1374 can be used to indicate to the user in which torque setting the power tool 10 is set.

Figure 19:
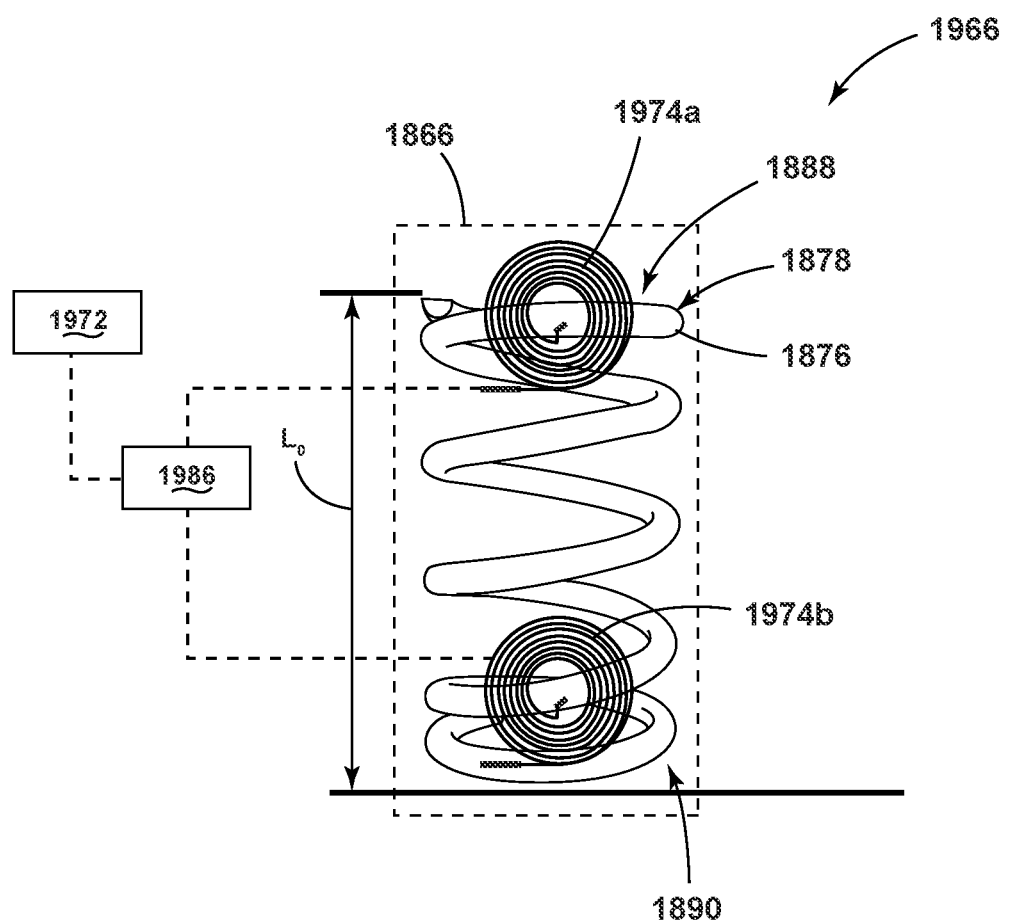
FIG. 19 is a plan view of still yet another alternative embodiment of the main clutch sensor in FIG. 10, illustrating a clutch spring of the clutch mechanism in the low torque setting.

FIG. 19 illustrates a main clutch sensor 1966 according to another embodiment of the invention. The main clutch sensor 1966 shown in FIG. 19 is like the main clutch sensor 466 of the power tool 10 shown in FIGS. 10-13, with like structure being identified with like reference numerals plus "1500."

With reference to FIG. 19, the main clutch sensor 1966 includes a first inductive sensor 1974a, a second inductive sensor 1974b, and a conductor or target 1876. In this embodiment, the conductor 1876 is the clutch spring 1878, and the conductor 1876 is circumferentially disposed around the inductive sensors 1974a, 1974b. In other embodiments, the conductor 1876 (e.g., the spring 1878 or a cantilevered arm) may alternatively be adjacent and offset from the first and second inductive sensors 1974a, 1974b. As shown in FIG. 19, the inductive sensors 1974a, 1974b are circular inductive sensor having a uniform winding density along the diameter of the inductive sensors 1974a, 1974b. In other embodiments, the inductive sensors 1974a, 1974b may alternatively have a non-uniform winding density, such that the number or density of windings throughout the length of the sensor varies. In this embodiment of the main clutch sensor 1966, the measured change in inductance of the sensor 1974a, 1974b in response to movement of the conductor 1876 relative to the sensors 1974a, 1974b is compared to a constant reference signal from a reference clock 1972 to indicate to the user in which torque setting the power tool 10 is set.

The first inductive sensor 1974a is disposed adjacent the first end 1888 of the clutch spring 1878 while the second inductive sensor 1974b is disposed adjacent the second end 1890 of the clutch spring 1878. The first and second inductive sensors 1974a, 1974b are stationary, such that the inductive sensors 1974a, 1974b do not move when the torque mechanism 1866 is adjusted between the low torque setting and the high torque setting. The inductive sensors 1974a, 1974b can communicate induction signals to an MCU 1986 corresponding to the relative movement between the conductor 1876 and the magnetic fields of the induction sensors 1974a, 1974b. As discussed above, this produces Eddy currents in the conductor 1876 that oppose the electromagnetic field created by the inductive sensors 1974a, 1974b. This changes the inductance of the inductive sensor 1974a, 1974b, which is used in part to determine the length L (e.g., $L_0$, $L_1$, $L_2$) of the conductor 1876 and ultimately the amount of torque.

With continued reference to FIG. 19, the reference clock 1972 is isolated from the conductor 1876, such that the reference clock 1972 is not affected by the Eddy currents in the conductor 1876. Therefore, the reference clock 1972 is operable to output a constant reference signal, the purpose of which is described in detail below. The MCU 1986 and the main clutch sensor 1366 receive the output of the inductive sensors 1974a, 1974b and the reference clock 1972, and are electrically connected to the user interface 178. The MCU 1986 continuously receives a first inductive signal from the first inductive sensor 1974a indicative of the change in position of the conductor 1876, a second inductive signal from the second inductive sensor 1974b indicative of the change in position of the conductor 1876, and the constant reference signal from the reference clock 1972.

Using the first and second inductive signals and the constant reference signal as inputs, the MCU 1986 is operable to calculate a frequency ratio, which is a ratio of the inductive signals to the constant reference signal. Specifically, the MCU 1986 calculates a first frequency ratio and a second frequency ratio, and digitally outputs a first ratio signal indicative of the first frequency ratio and a second ratio signal indicative of the second frequency ratio to the MCU 1986. The MCU 1986 is operable to interpolate the first and second ratio signals to determine in which torque setting the tool 10 is set. Once the torque setting is determined, the MCU 1986 outputs the torque setting to the user interface 178.

Various features of the invention are set forth in the following claims.

What is claimed is:

1. A rotary power tool comprising:
   a gear case;
   an output shaft extending from the gear case;
   a drive mechanism configured to provide torque to the output shaft, causing the output shaft to rotate;
   a clutch mechanism between the output shaft and the drive mechanism, the clutch mechanism configured to limit the amount of torque provided by the output shaft, the clutch mechanism including a compression spring;
   a sensor positioned on a neck portion of the gear case subject to strain imparted by the compression spring; and
   an electronic control unit configured to receive an output signal from the sensor and determine a torque setting of the clutch mechanism based on the output signal.

2. The rotary power tool of claim 1, further comprising a clutch adjustment assembly configured to adjust a compressed length of the compression spring, wherein the electronic control unit is configured to correlate the output signal of the sensor with the compressed length of the compression spring.

3. The rotary power tool of claim 2, wherein the clutch mechanism is moveable via the clutch adjustment assembly between a first torque setting, a second torque setting, and at least one discrete torque setting between the first torque setting and the second torque setting.

4. The rotary power tool of claim 3, further comprising a user interface, wherein the electronic control unit sends a signal causing the user interface to display the discrete torque setting based on the determined torque setting of the clutch mechanism.

5. The rotary power tool of claim 2, wherein the clutch adjustment assembly includes a collar disposed circumferentially around the neck portion of the gear case and a nut threadably coupled to the neck portion of the gear case, wherein the nut co-rotates with the collar to adjust the compressed length of the compression spring.

6. The rotary power tool of claim 5, wherein the sensor includes a strain gauge coupled to the nose portion, wherein a compression force of the compression spring is exerted between the nut and the gear case, thereby straining the nose portion under tension, and wherein the strain of the nose portion is detected by the strain gauge.

7. The rotary power tool of claim 5, wherein the sensor includes an inductive sensor producing an electromagnetic field, and wherein the compressed length of the compression spring is determined by the change in inductance of the inductive sensor.

8. The rotary power tool of claim 1, further comprising a motor operably coupled to the drive mechanism and a motor sensor that detects an amount of current drawn by the motor, wherein the electronic control unit is configured to identify a clutching event based on feedback from the motor sensor, and wherein the electronic control unit is configured to deactivate the motor when the clutching event occurs.

9. The rotary power tool of claim 1, further comprising a switch that is actuated when the clutch mechanism disengages during a clutching event, wherein the electronic control unit is configured to deactivate the motor in response to receiving a switch signal from the switch.

10. A rotary power tool comprising:
a gear case;
an output shaft extending from the gear case;
a drive mechanism configured to provide torque to the output shaft, causing the output shaft to rotate;
a clutch mechanism between the output shaft and the drive mechanism, the clutch mechanism configured to limit the amount of torque provided by the output shaft, the clutch mechanism including a compression spring;
a clutch adjustment assembly configured to adjust a compressed length of the compression spring;
a lockout feature adjustable between a lockout state, in which adjustment of the compressed length of the compression spring by the clutch adjustment assembly is prevented, and a release state, in which adjustment of the compressed length of the compression spring by the clutch adjustment assembly is permitted; and
an electronic control unit configured to receive an output signal from a sensor indicative of the compressed length of the compression spring, wherein the electronic control unit is configured to determine a torque setting of the clutch mechanism based on the output signal,
wherein the lockout feature sends another output signal to the electronic control unit to alert a user when the torque setting of the clutch mechanism is adjusted by the clutch adjustment assembly.

11. The rotary power tool of claim 10, wherein the clutch adjustment assembly includes a collar disposed circumferentially around the neck portion of the gear case and a nut threadably coupled to the neck portion of the gear case, wherein the nut co-rotates with the collar to adjust the compressed length of the compression spring.

12. The rotary power tool of claim 11, wherein the lockout feature mechanically interferes with the collar so that the collar is no longer capable of rotating relative to the gear case.

13. The rotary power tool of claim 10, further comprising a user interface, wherein the electronic control unit sends a signal causing the user interface to display the discrete torque setting based on the determined torque setting of the clutch mechanism.

14. The rotary power tool of claim 10, further comprising a motor operably coupled to the drive mechanism and a motor sensor that detects an amount of current drawn by the motor, wherein the electronic control unit is configured to identify a clutching event based on feedback from the motor sensor, and wherein the electronic control unit is configured to deactivate the motor when the clutching event occurs.

* * * * *